United States Patent [19]
Amram et al.

[11] Patent Number: 5,537,586
[45] Date of Patent: Jul. 16, 1996

[54] ENHANCED APPARATUS AND METHODS FOR RETRIEVING AND SELECTING PROFILED TEXTUAL INFORMATION RECORDS FROM A DATABASE OF DEFINED CATEGORY STRUCTURES

[75] Inventors: Joseph A. Amram, Boston; Jacques Bouvard, Wellesley; James E. Leightheiser, Lexington; John C. Lidington, Hull; Majed G. Tomeh, Sudbury; Harry C. Wu, Concord, all of Mass.

[73] Assignee: Individual, Inc., Burlington, Mass.

[21] Appl. No.: 239,421

[22] Filed: May 6, 1994

Related U.S. Application Data

[63] Continuation-in-part of Ser. No. 876,328, Apr. 30, 1992, abandoned.

[51] Int. Cl.⁶ .............................. G06F 17/30; G06F 7/00
[52] U.S. Cl. .............. 395/600; 364/419.19; 364/419.13; 364/419.07; 364/DIG. 1; 364/282.1; 364/283.2; 364/225.4
[58] Field of Search ...................... 395/600; 364/DIG. 1, 364/491.19, 419.07, 491.13

[56] References Cited

U.S. PATENT DOCUMENTS

| | | | |
|---|---|---|---|
| 4,255,796 | 3/1981 | Gabbe et al. | 395/600 |
| 4,674,066 | 6/1987 | Kucera | 364/900 |
| 4,712,174 | 12/1987 | Minkler, II | 364/200 |
| 4,744,050 | 5/1988 | Hirosawa et al. | 364/900 |
| 4,970,681 | 11/1990 | Bennett | 364/900 |
| 4,984,178 | 1/1991 | Hemphill et al. | 364/513.5 |
| 4,996,642 | 2/1991 | Hey | 364/419 |
| 5,043,891 | 8/1991 | Goldstein et al. | 364/419 |
| 5,077,668 | 12/1991 | Doi | 364/419 |
| 5,084,819 | 1/1992 | Dewey et al. | 364/419 |
| 5,093,918 | 3/1992 | Heyen et al. | 395/725 |
| 5,222,234 | 6/1993 | Wang et al. | 395/600 |
| 5,263,167 | 11/1993 | Conner, Jr. et al. | 395/700 |
| 5,297,027 | 3/1994 | Morimoto et al. | 364/419.19 |
| 5,299,123 | 3/1994 | Wang et al. | 364/419.1 |
| 5,303,361 | 4/1994 | Colwell et al. | 395/425 |
| 5,384,703 | 1/1995 | Withgott et al. | 364/419.19 |
| 5,418,951 | 5/1995 | Damashek | 395/600 |
| 5,428,778 | 6/1995 | Brookes | 395/600 |

OTHER PUBLICATIONS

Sultan, G. et al. "The SMART and SIRE Experimental Retrieval Systems," *Introduction to Modern Information Retrieval*, McGraw Hill Inc., 1983, pp. 118–156.

Weitzen, H. S., "Infopreneurs: Turning Data Into Dollars," John Wiley & Sons, Inc., 1988, pp. 44–45.

Wiegner, K. K., "All the news that fits," Forbes, Apr. 30, 1990, pp. 174–175.

*Primary Examiner*—Thomas G. Black
*Assistant Examiner*—Jean R. Homere
*Attorney, Agent, or Firm*—Testa, Hurwitz & Thibeault

[57] ABSTRACT

A method for extracting a preferred set of textual records from a database includes the following features. Priority values are assigned to each of a plurality of predefined category structures. Textual records are assigned a relevance value with respect to each category structure. If a record's relevance value exceeds a predetermined threshold value, that record is associated with the category structure. Each category has a list of associated textual records which are retrieved. Textual records are selected from the set of retrieved textual records and assembled into a set. Information on how the subscriber uses the set is gathered, and new rankings for the category structure are computed.

10 Claims, 22 Drawing Sheets

EDITORIAL BREAKDOWN

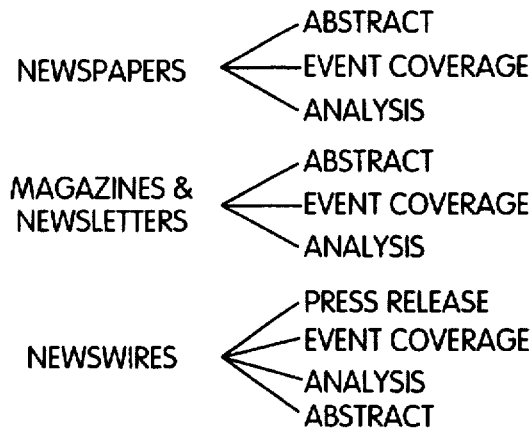

NEWSPAPERS — ABSTRACT / EVENT COVERAGE / ANALYSIS

MAGAZINES & NEWSLETTERS — ABSTRACT / EVENT COVERAGE / ANALYSIS

NEWSWIRES — PRESS RELEASE / EVENT COVERAGE / ANALYSIS / ABSTRACT

DETERMINE SOURCE

FOR EXAMPLE ...
        IF BUSINESS WIRE, AP, REUTERS
            THEN - NEWSWIRE
        OR IF PC WEEK, HEALTH NEWS DAILY, EC TIMES
            THEN - MAGAZINE / NEWSLETTER
        OR IF BOSTON GLOBE, MIAMI HERALD, DETROIT FREE PRESS
            THEN - NEWSPAPER

DETERMINE EDITORIAL STYLE

FOR EXAMPLE ...
        IF STORY < 300 WORDS
            THEN - ABSTRACT
        OR IF KEY CONCEPTS & TERMS AT BEGINNING
            THEN - EVENT COVERAGE
        OR IF PRODUCT INFORMATION AT BEGINNING
            THEN - PRESS RELEASE
        OR IF KEY CONCEPTS & TERMS DISPERSED THROUGHOUT
            THEN - ANALYSIS

SELECTIVELY EXTRACT BRIEF

FOR EXAMPLE ...
        IF ABSTRACT
            THEN - TAKE ALL
        OR IF PRESS RELEASE
            THEN - TAKE OPENING OF ARTICLE
        OR IF EVENT COVERAGE FROM NEWSWIRE OR NEWSPAPER
            THEN - TAKE TITLE
        OR IF ANALYSIS
            THEN - TAKE CONCENTRATED CLUSTER OF KEY CONCEPTS AND TERMS

Fig. 15

ENHANCED APPARATUS AND METHODS FOR RETRIEVING AND SELECTING PROFILED TEXTUAL INFORMATION RECORDS FROM A DATABASE OF DEFINED CATEGORY STRUCTURES

This application is a continuation-in-part of Ser. No. 07/876,328, now abandoned, filed Apr. 30, 1992

BACKGROUND OF THE INVENTION

The invention relates to the retrieval of a set of textual records from a database and in particular to the retrieval of such records based on category structures.

It is well known to retrieve information stored in computer databases. In the SMART information retrieval system, described in "Introduction to Modern Information Retrieval, The SMART and SIRE Experimental Retrieval Systems", by Gerald Salton and Michael McGill, McGraw-Hill, New York, 1983, pages 118–156, information is retrieved based on measures of similarity between documents searched and a given query.

It is also known to perform ongoing electronic searches, in which documents in a database are periodically searched for certain words or queries. For example, a company might want to track news items mentioning its name or the name of competing companies.

SUMMARY OF THE INVENTION

In general, the invention features extracting a preferred set of textual records from a database using category constructs, which act as versatile information retrieval building blocks. Priorities are assigned to the category structures based on a ranking, and records are associated with the stored category structures to which they are relevant. The selection of records retrieved for assembly into the preferred set is responsive to the assigned priorities. New priorities may be assigned to category structures based on an evaluation of the quality of the assembled set.

In general, in another aspect, the invention features assigning priority values to stored category structures to form a profile associated with a subscriber, and collecting usage information from the subscriber for the retrieved text records forming the preferred set of the subscriber's profile. A new ranking is assigned for category structures associated with each profile determined by the usage information. In embodiments of the invention, the textual records include full text records and brief text records (briefs), each associated with a full text record. Usage information can be collected for the subscriber usage of the full text records.

In other embodiments, the invention features retrieving, assembling and transmitting briefs to each appropriate subscriber. Requests are received from the subscriber for the full text record associated with one or more of the briefs. The full text record is retrieved from the database and transmitted to the requesting subscriber. Usage information is collected to track the full text record requests from each subscriber.

In still other embodiments, the invention features ranking the category structures for the subscriber profiles in order of subscriber usage for the text records associated with the category structures. The usage rank is compared with the original rank for each category structure to determine a new rank for the category structures. Numerical weights are assigned to each category structure determined by its original rank, the usage of its text records by the subscriber, and the usage of its text records by peers. A new rank is assigned for each category structure determined by summing the numerical weights.

In yet other embodiments, the invention features extracting a brief from a full text record by determining the source and editorial style of the full text record, and selectively extracting portions of the full text record depending on its source and editorial style, to provide the brief. Determining the editorial style can include defining the length and identifying the location of key terms in the full text record. The brief can be provided by extracting the entire full text record if its length is less than a predetermined value, or extracting one or more sentences including identified key terms.

In still other embodiments, the invention features defining neighboring category structures associated with each subscriber and retrieving text records associated with the neighboring category structures. If the collected usage information from the subscriber indicates usage of the text records from a neighboring category structure, then a priority value is assigned to the neighboring category structure to include the structure in the profile associated with the subscriber.

In other embodiments, one or more attribute preferences are associated with attributes of text records to be retrieved and with the subscriber profile. If an identified text record fails to satisfy the defined attribute preferences, and if a secondary text record related to the identified text record exists and satisfies the attribute preferences, then the secondary text record replaces the identified text record. The attributes can include, for example, the source, author, cost, length and editorial style of the text record.

In general, in another aspect, the invention features a method and apparatus for providing textual records from a database to a subscriber by transmitting a preferred set of assembled briefs to a subscriber and receiving requests from the subscriber for full text records associated with one or more of the briefs. The requested full text records are retrieved from the database and transmitted to the requesting subscriber. The transmission can be by facsimile, electronic mail, or other means. Requests can be received by an automated interactive telephone system, electronic mail, or other means.

Embodiments of the invention include providing a full text record limit and a brief limit. Full text records are retrieved up to the full text record limit and briefs are retrieved up to the brief text limit. Full text records can be retrieved up to the full text record limit by first retrieving records from the associated category structures, and then, if the retrieved full text records number less than the full text record limit, retrieving full text records from other category structures to fill the full text record limit.

In general, in another aspect, the invention features defining a group of subscribers sharing a common characteristic, compiling usage information for the subscribers of the defined group and analyzing the compiled usage information to detect a usage pattern for the group. New category structures are defined in accordance with the detected usage pattern. A new ranking is assigned for the new category structures for each subscriber belonging to the defined group. Embodiments include redistributing text records from a pre-existing category structure into two or more new category structures, or combining the text records from at least two pre-existing category structures in a new category structure. The defined group can include, for example, all subscribers, subscribers having a common profession, or subscribers having a similar geographical location.

In general, in still another aspect, the invention includes a method and apparatus for on-line service providers to provide textual records to subscribers. Text records are received from information providers, and formatted into a common format. Tags are associated with various components and attributes of the text records. The text records and tags are transmitted to on-line service providers and stored on an on-line provider database. Subscribers define a profile for selecting text records from the on-line provider database in response to the contents of particular tags. Text records are selected and retrieved from the on-line provider database and transmitted to the subscriber.

In general, in another aspect, the invention features a method and apparatus for tracking text records having entity-specific data, including attaching tags to a text record stored on a database corresponding to each identified entity that is part of the record's contents. The text records are sorted into category structures, each corresponding to an identified entity, according to the attached tags. A tagged text record is excluded from a category structure if the record fails to satisfy rules associated with the identified entity. Retained text records are ranked within a category structure in accordance with its relevance to the associated entity.

The retrieval method and apparatus of the invention permit highly specific and versatile ongoing searches based on a library of defined category structures. These structures can substantially reduce the difficulty of creating a search profile while improving its quality to produce a series of ongoing profile-specific news dispatches. The retrieval process may also be completely automated, resulting in reduced cost and the virtual elimination of human error. User feedback permits fine tuning of the search profile, and may also be fully automated. Duplicative but different records may be eliminated, leaving more space for non-redundant information in the assembled set of records.

BRIEF DESCRIPTION OF THE DRAWINGS

FIG. 15 is pseudo-code illustrating an extraction process of this invention for extracting a brief textual record from a full textual record.

DESCRIPTION OF THE INVENTION

Figure 1:
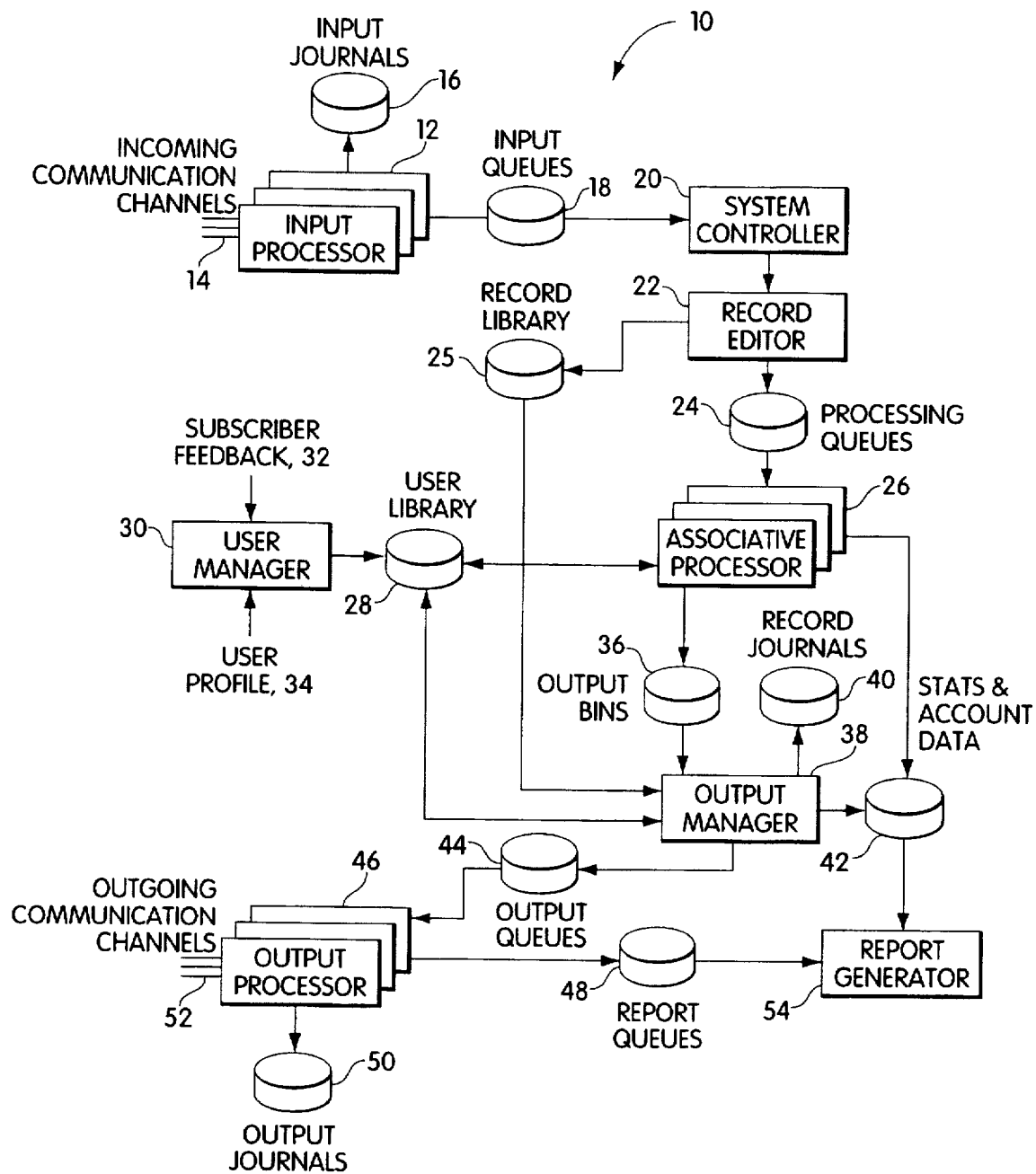
FIG. 1 is a block diagram illustrating a textual record retrieval system according to the invention.

Referring to FIG. 1, one possible embodiment of an electronic system for retrieving textual records on an ongoing basis 10 includes an input processor 12, which is connected to receive information over incoming communication channels 14, and is associated with input journal storage 16. A system controller 20 is connected to receive input queue information from the input processor via input queue storage 18 and to provide information to one or more record editors 22. Each editor is associated with an input source and is responsible for converting that input format to a canonical (standard) format. The record editor maintains a record library in record library storage 25, and provides an output to the associative processor 26 via processing queue storage 24. The associative processor 26 generates measures of relevance of records using queries stored in the user library storage 28, and may employ an associative information retrieval system, such as the SMART system. User manager 30 receives and processes subscriber feedback 32 and user profiles 34. Output bins 36 receive search information from the associative processor, and provide it to the output manager 38. The output manager 38 provides output to record journal storage 40, statistics and account data storage 42, and output queue storage 44. An output processor 46 receives information from the output queue storage 44 and provides information to report queue storage 48 as well as to output journal storage 50. The output processor 46 also provides output on outgoing communication channels 52, such as subscriber fax lines. A report generator 54 accesses statistics and account data storage and report queue storage. It is observed that this exemplary embodiment may be altered in a variety of ways without departing from the spirit and scope of the invention. In particular, this embodiment is not intended as the broadest expression of the invention, which is to be defined by the claims.

In operation, the input processor 12 receives textual records, such as news stories, over incoming communication channels 14, which may be newswires. Copies of these records are maintained in the input journal storage 16, as backup. These records are also queued in input queue storage 18 and provided to the system controller 20. The record editor 22 maintains a copy of the records in its record library 25 in its standard format, which acts as the main record database. The record editor 22 also combines record segments which are transferred from the information providers as separate segments. The records contained in the record library 25 are the same as the backup records maintained in the input journal 16, except that the records maintained in the input journal 16 may be in raw communications formats, such as facsimile pixel data, whereas the record library 25 contains ASCII text versions of the records in a standard format. For example, this format may clearly delineate paragraphs, tables, and the like. The record editor 22 provides the non-duplicative records to the processing queue storage 24.

Figure 9:
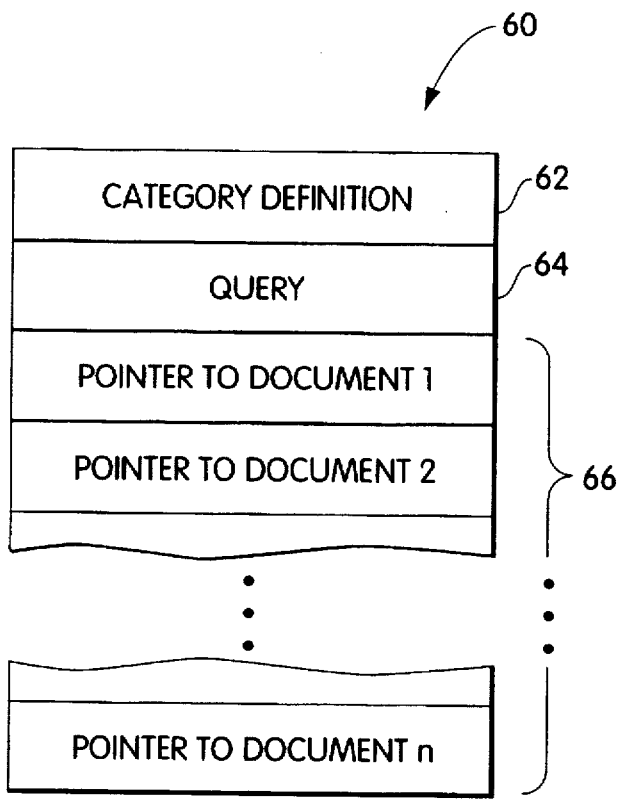
FIG. 9 is a block diagram illustrating an exemplary category structure.

The user manager provides rankings of category structures and stores them in the user library 28. Category structures 60 (see also FIG. 9) each include a category definition 62, a query 64, and a series of pointers 66. Initially, these pointers are vacant. For example, a certain category structure may have a definition associated with it (e.g., mid-size computer systems). The query will be a query designed to retrieve records related to the category definition. The category structure illustrated in FIG. 9 is an exemplary structure, and it will be clear to those skilled in the art that the information maintained in such a structure may be represented in various other forms. From the point of view of the user, the category structures act as building blocks ("category structures" and "building blocks" are interchangeable terms herein) that can be manipulated to meaningfully tailor the retrieval operations. Generally, the user only interacts with the definition of the category structures.

The associative processor 26 accesses the queries in the user library 28, and performs searches using those queries on queued incoming records. If an incoming record is relevant to the query associated with a given category structure, a pointer to that textual record will be added to that category structure (see also FIG. 9). A measure of relevance obtained from the associative processor 26 may also be associated with each pointer. The associative processor employs the output bins 36 as an internal processing area.

The output manager 38 assembles a preferred set of the records (e.g., an electronic news dispatch) and provides them to output queues 44, using the journal storage 40 for internal processing. The preferred set of records is provided to the output processor, which translates the ASCII representation of the sets into a format that may be transmitted and transmits them over output lines such as subscriber fax lines 52. The output processor 46 maintains a backup copy of each assembled set, in a representation that is ready to be transmitted, such as a facsimile pixel format or an electronic mail format. The output processor also provides lists to report queues 48, which are in turn provided to the report generator 54.

The report generator 54 accesses the queried lists in the report queues 48 and generates feedback questionnaires. The report generator 54 also manages data received from the statistics and account data storage 48 and may perform operations such as royalty calculations for the information providers. This report generator 54 may need to be relatively versatile, as information providers tend to offer a variety of different pricing schemes.

The operation of the system of FIG. 1 will now be further described with reference to the flowcharts of FIGS. 2–7.

Figure 2:
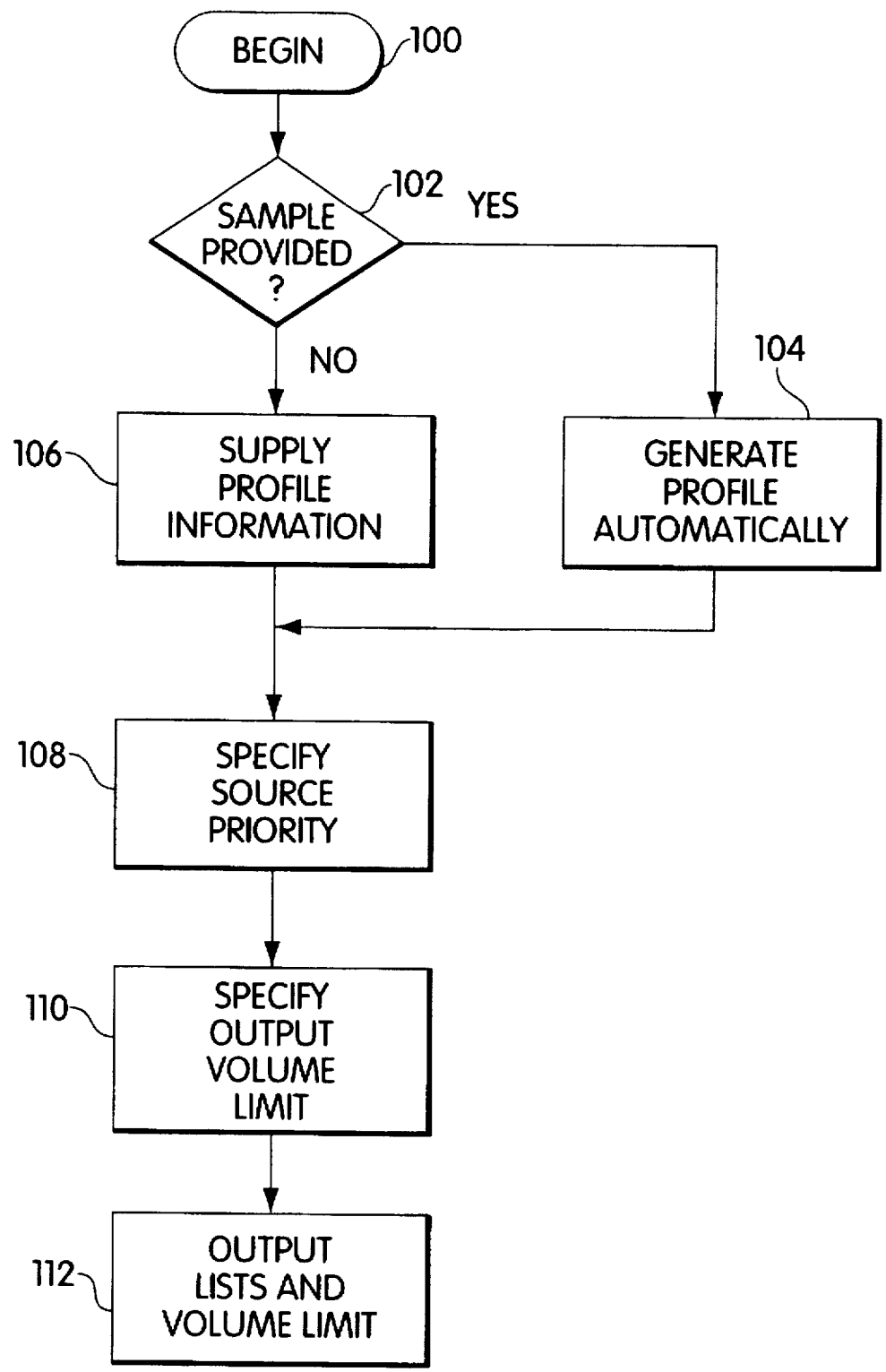
FIG. 2 is a flowchart illustrating input operations performed in connection with the textual record retrieval system of FIG. 1.

Referring to FIG. 2, whenever a new profile is required, a sequence of user manager input operations is started (step 100). First, the user manager determines whether a sample has been provided (step 102). A sample is a set of textual records with associated preference information. For example, it may be a list of stories, with the relevance of those stories ranked or otherwise evaluated. If a sample has been provided, it is used to generate a profile automatically (step 104). If no sample is provided, the system must be provided with raw profile information (step 106). Source priority information, such as a ranking of newswires is then defined, allowing a user to receive a story from a preferred service if more than one service provides it (step 108). The users' output volume limit is also specified at this time (step 110). This output limit may correspond, for example, to the maximum number of records in the final set, or it may correspond to a maximum text volume measure in bytes. The results of the input operation constitute the profile for a user and include a priority list for category structures, a priority list for sources, and a volume limit k (step 112).

Figure 3:
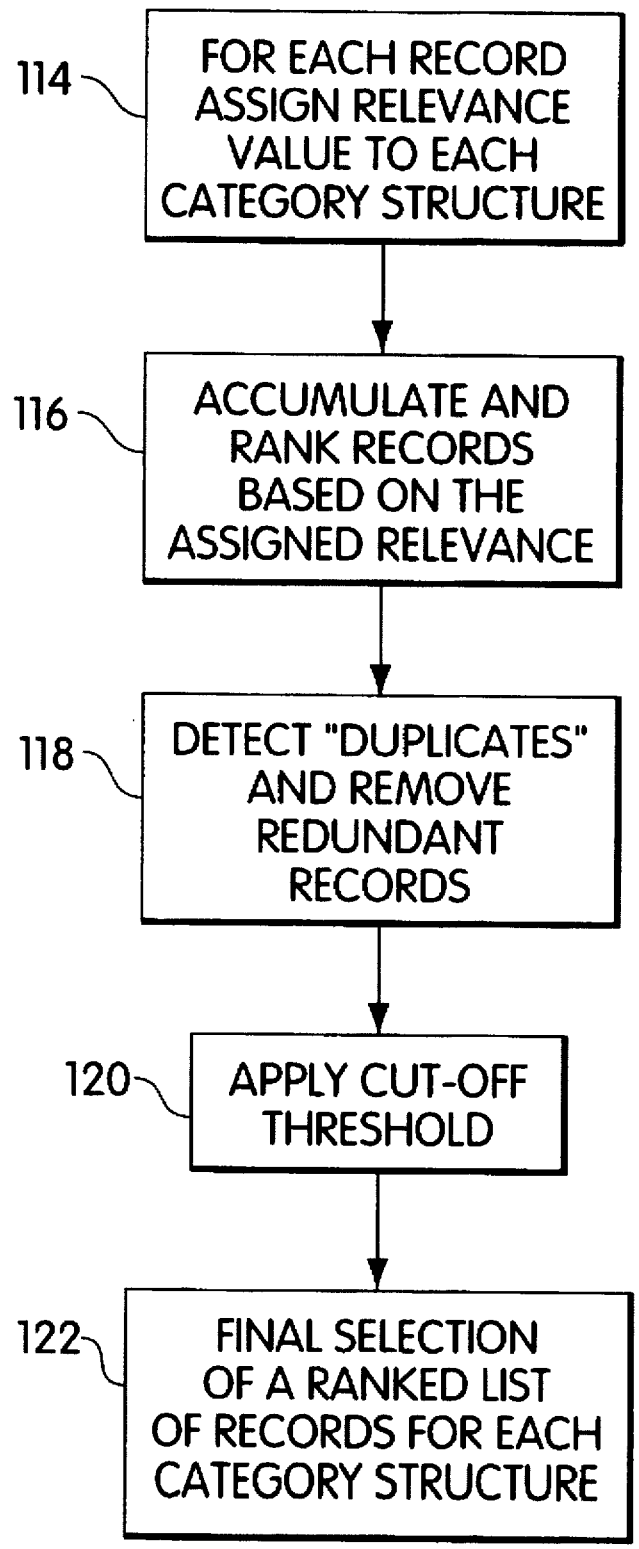
FIG. 3 is a flowchart illustrating operations performed to the database upon the reception of records.

Referring to FIG. 3, as new records are received they are each assigned a weight relevance value against each category structure by the associative processor 26 (step 114). As the records are accumulated, they are ranked based on the assigned relevance values (step 116). Duplicates are then detected and eliminated (step 118). A cutoff threshold determined for each category structure is then applied to records with respect to each category structure (step 120). If the relevance value for a record exceeds the cutoff threshold for a given category structure, a pointer identifying the record is included in the category structure. The cutoff threshold is different for different categories and is generally empirically determined. As a result of the above operations, the system maintains a ranked list of records received for each category structure (step 122). These operations are generally performed on an ongoing basis, until a newsletter is to be generated.

Figure 4:
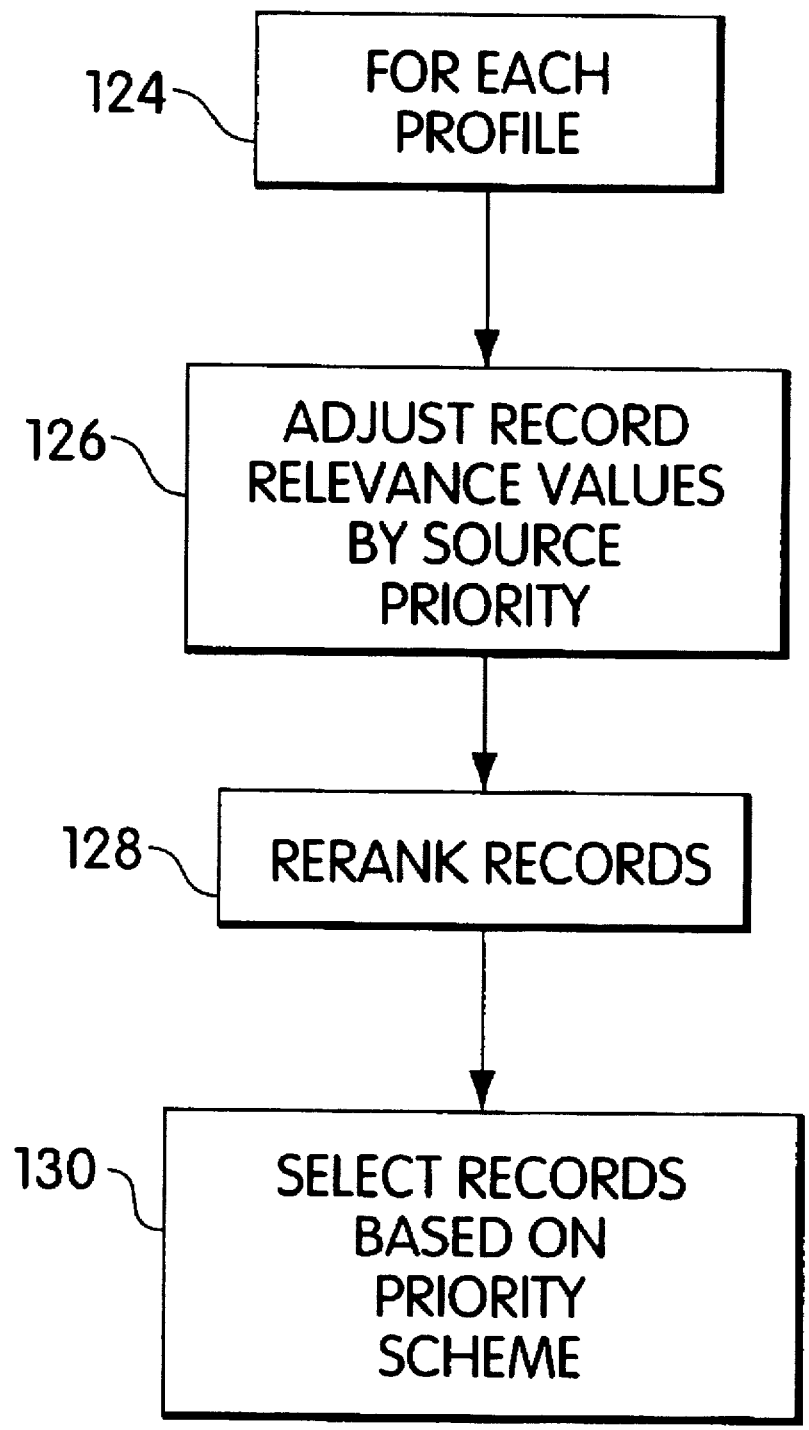
FIG. 4 is a flowchart illustrating the assembling operations for textual records retrieved from the database to form a preferred set.

A full sequence of assembling operations may be successively repeated (e.g., daily for a daily newsletter). Referring to FIG. 4, generally, the individual assembling operations are performed for each profile (step 124). Since each profile may include a different source prioritization, the relevance values are separately tailored for each profile, based on the source priority selection (step 126). These adjusted values are used to rerank the records for each category structure in the profile (step 128). The records are then selected based on a priority scheme to create the final set (step 130). This step will be described in further detail below.

Figure 5:
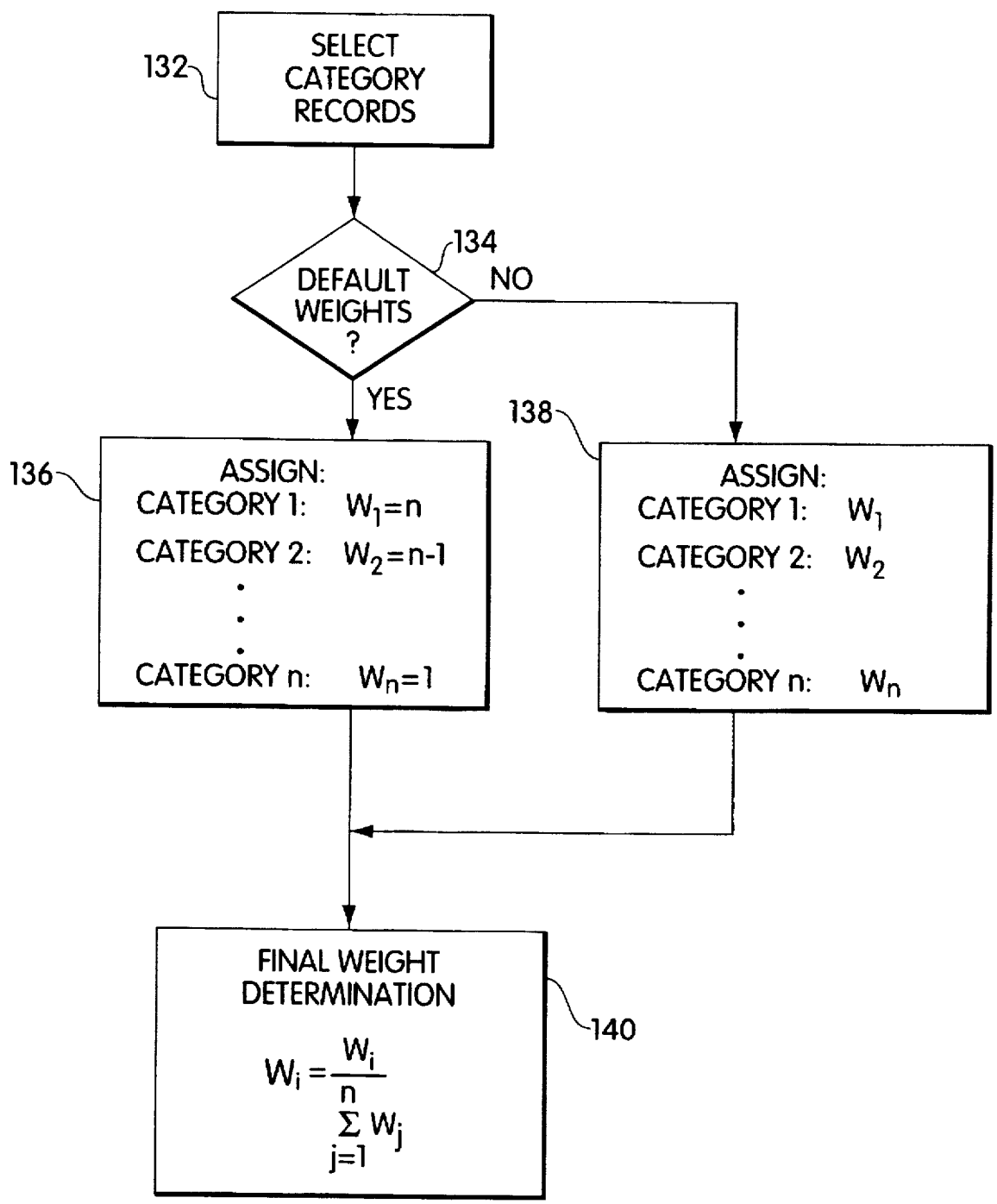
FIG. 5 is an expanded illustration of the "generate profile" block of FIG. 2, illustrating weighting operations in the generation of a profile.

Referring now to FIG. 5, the step of supplying profile information (FIG. 1, step 106) includes providing the system with a user selection of category records (step 132). The selected category records may be weighted to indicate not only priority among categories, but also degrees of preference. Alternatively, the user may select default weights (step 134). If default weights are selected, the system assigns successive decreasing integer values for the weights based on his or her preferences (step 136). Alternatively, the user may enter weights for the various categories (step 138). The final weight determination is then made (step 140), which is essentially a normalization of the weights relative to the other weights, and may be performed using the following formula.

$$W_i = \frac{w_i}{\sum_{j=1}^{n} w_j}$$

Figure 6:
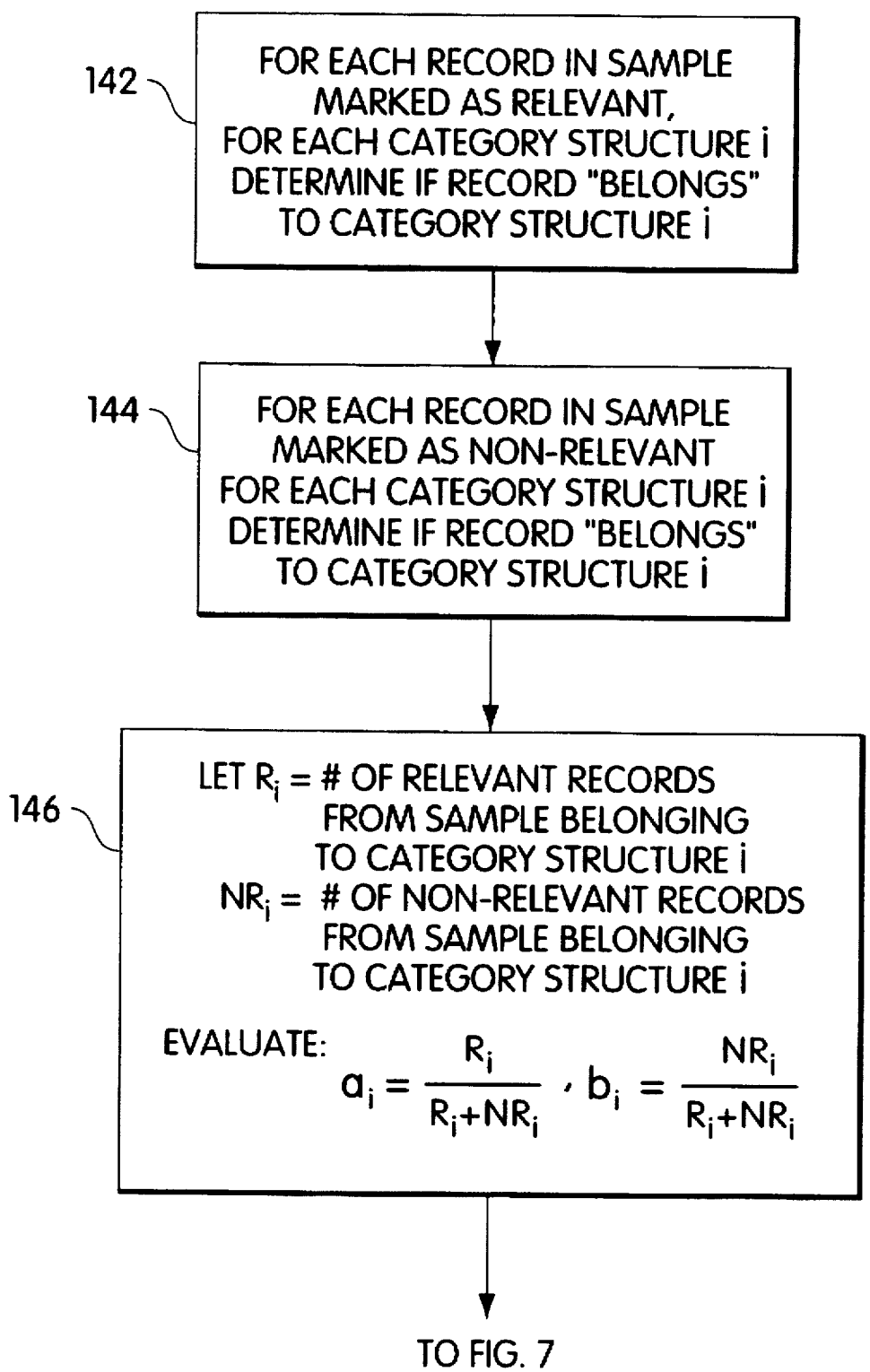
FIG. 6 is a flowchart illustrating feedback operations performed by the textual record retrieval system of FIG. 1.

Referring to FIG. 6, the system of the invention allows for efficient user feedback. Operations performed by the system in this feedback process are performed based on a sample. This sample may be a previous selection of records, which may or may not have been generated by the system of the invention. For example, a sample may include records rated "relevant," "not relevant" or "undecided." Each record in the sample that is marked "relevant" is matched with each category structure, and the system determines if the record belongs to that category structure (step 142). By "belongs," it is meant that the record is relevant to that category structure to the degree that it exceeds the cutoff threshold. This process is then repeated for each record in the sample that is marked as "not relevant" (step 144). The number $R_i$ of relevant records from the sample, which belong to each category structure I, may now be determined (step 146). Also, the number $NR_i$ of non-relevant records from the sample, which belong to each category structure i may be determined (step 146). Of course, these sums may be accumulated as relevance is determined (steps 142, 144) rather than as a separate accumulating step. The feedback coefficients $a_i$, $b_i$, are then determined (step 146). These are, respectively, the ratio of relevant records to relevant and non-relevant records, and the ratio of non-relevant records to relevant records and non-relevant records.

Figure 7:
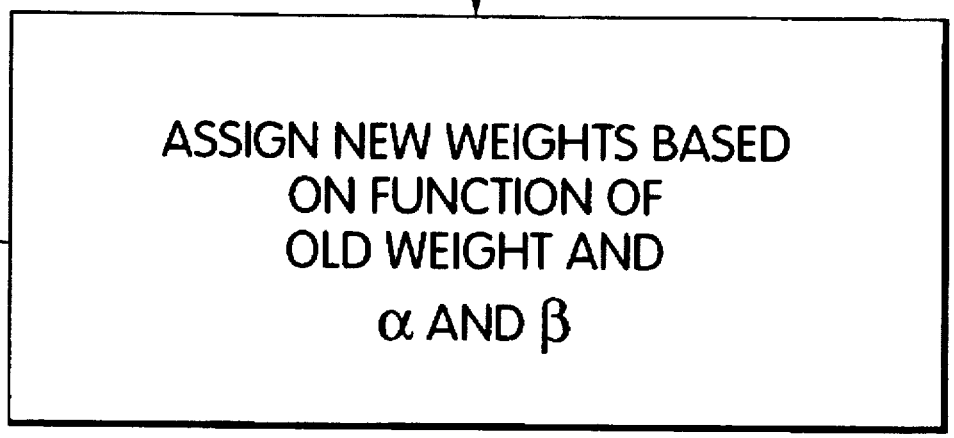
FIG. 7 is a continuation of the flowchart of FIG. 6.

Referring to FIG. 7, new weights may now be assigned to the category structures based on a function of the old weights, and system coefficients $\alpha$ and $\beta$.(step 148) The system coefficients $\alpha$ and $\beta$ are performance factors determined empirically for the system. To determine these factors, the system may be operated while varying the factors and the results evaluated, with optimum values of $\alpha$ and $\beta$ being determined by optimum performance of the system. Different functions may be used to assign the new weights to the category structures, and these will also affect $\alpha$ and $\beta$. For example, the following function may be used:

$$\text{new } w_i = \alpha \cdot \text{old } w_i + (1-\alpha)[a_i - \beta b_i]$$

Other formulas are usable, with the exact formula depending on the application and desired performance of that application. As textual preferences are generally not precise mathematical generalities, such a system will have to be fine-tuned until optimum results are obtained. It is observed that, in the case of an automatic profile generation, with no available earlier weights, the old weights are all set to zero (See FIG. 2, step 104).

There are several different possible priority schemes that may be used to select the records to be included in the final set (FIG. 4, step 130). A first scheme is a strict ranking scheme, where all records are retrieved from the highest priority category structure until relevant records for that category structure are exhausted. Records are then retrieved from the next most relevant category structure, and are added to the output set. This process is repeated until the output set reaches its volume limit k, which may correspond to either a record number or a byte count.

A second scheme is a round-robin scheme, in which the most relevant record from successive category structures is retrieved until there are no category structures remaining. Then, the second-most relevant record from each category structure is retrieved. This process is repeated until the output limit is reached.

A weighted scheme may also be employed. This scheme causes the system to retrieve a variable number of records associated with each category structure depending on the weights assigned to the category structures. The number of records to be retrieved for each category structure may be determined by taking the smallest integer greater than:

$$\frac{w_i}{\sum_{j=1}^{n} w_j} k$$

This formula is used to add records to the output set until the output set limit k is reached. In the case of a byte limit, estimates of the number of records to retrieve are used in the above formula.

Figure 8:
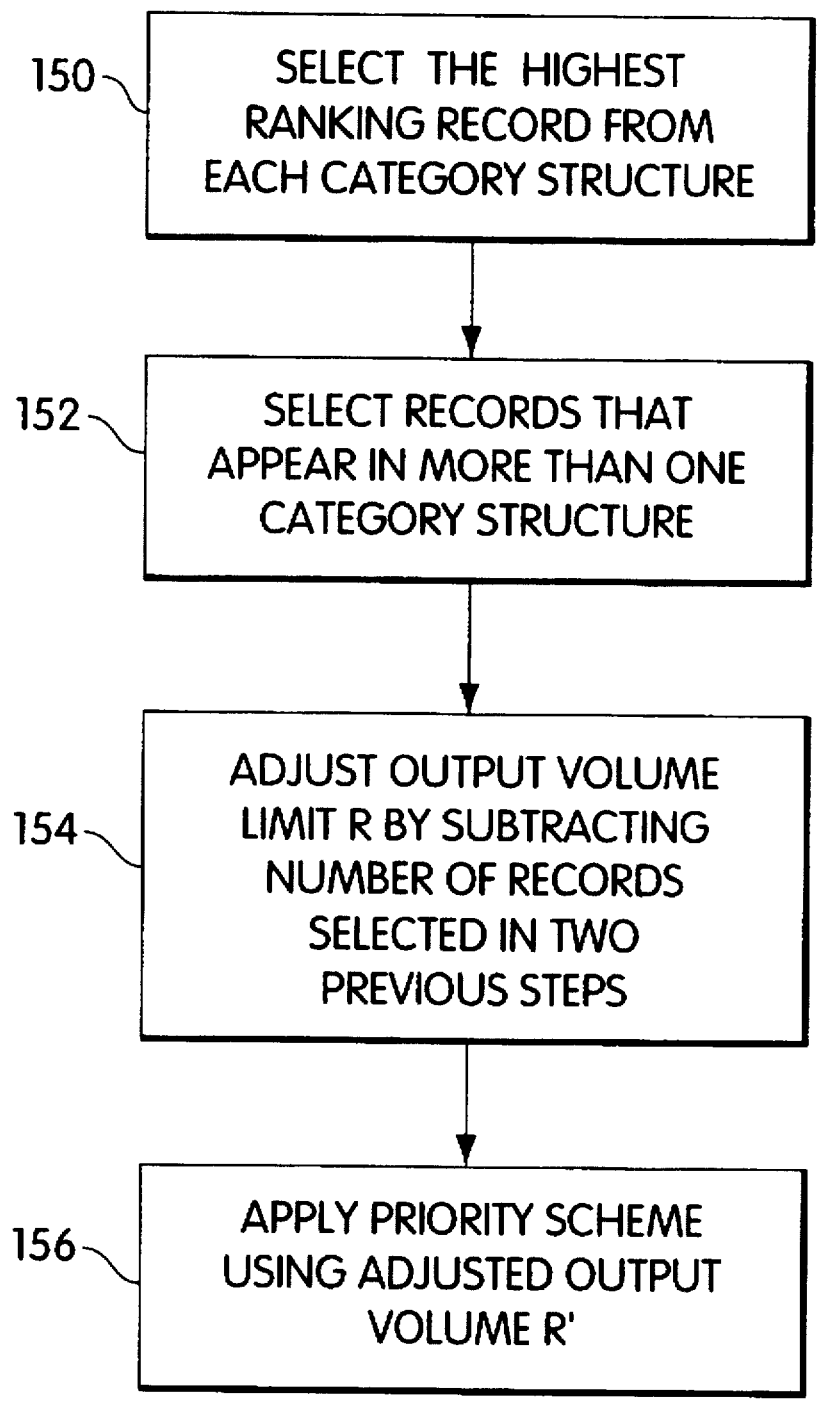
FIG. 8 is a flowchart illustrating variations on the priority schemes used by the system of FIG. 1.

Referring to FIG. 8, each of the above schemes may be modified using the following variation. First, the highest ranking record is selected from each category structure (step 150). This may be the most relevant news story for each category structure. Records that appear in more than one category structure are then selected (step 152). These may correspond to news stories that are relevant to more than one category structure. The output volume limit k, is then adjusted by subtracting the number of records selected in the two previous steps (step 154). The adjusted output volume limit R' expresses the number of remaining slots in the output set, such as the remaining space in a newsletter. Any of the above-described priority schemes may then be applied to determine which records are to be included in these remaining slots (step 156).

Figure 11:
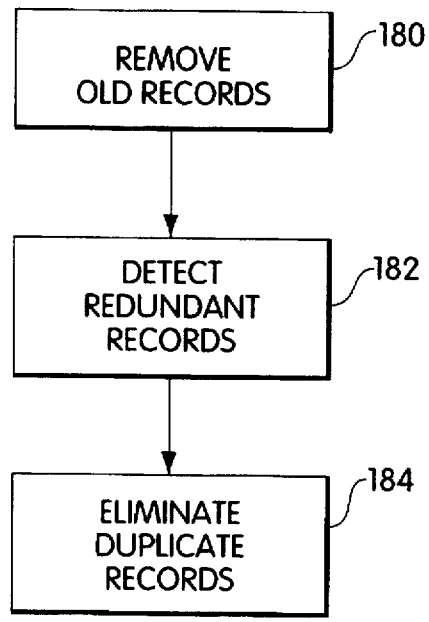
FIG. 11 is a flowchart illustrating duplicate record handling operations performed by the textual record retrieval system of FIG. 1.

Referring to FIG. 11, the step of detecting and eliminating duplicate records (step 118 in FIG.3) is applied to two types of potential duplicates. The first type of duplicative record is a record that is received by the system, but contains substantially the same information content as a record that has already been transmitted, (e.g., in an earlier news dispatch). This received record need not be identical to the transmitted record. In order to detect this sort of duplicate, a history of records transmitted for each profile is maintained. The history may be maintained for a limited number of transmissions (e.g., the last n issues). Each received record may then be compared with all of the records in this history. If any received record has a similarity value with respect to any record in the history that exceeds a predefined threshold $\gamma$, the record is removed (step 180). In this manner, similar records that have been received and transmitted recently are not retransmitted. The comparison may be performed using the SMART vector approach. The SMART system is described in the above-referenced Stalton Chapter, and its concepts are herein incorporated by reference.

A second type of redundant record is a record that is duplicative of other records that are received during the same interval between transmissions. For example, a similar news item may be carried by two different newswire services on the same day. This type of redundancy is detected (step 182) by constructing a matrix of received stories. The resulting matrix includes entries expressing the similarity of each story and every other story received since the last transmission. Entries in this matrix that do not exceed the predefined similarity threshold $\gamma$ may then be set to zero, while similarity values exceeding the threshold value $\gamma$ may be set to one. Cluster analysis may now be performed on this matrix in order to reduce it to a series of disconnected subgraphs. Each node in the disconnected subgraph will be connected to other nodes by an arc having a weight of one. These networks will represent groups of similar records. For each group of records, heuristics are applied to the records to determine which story is the preferred story. These heuristics include the choice of source, the age of the story, and the size of the story. Once a preferred story has been chosen, the remaining redundant records are deleted (step 184). In generating a newsletter with this method, the subscriber will receive the best available expression of the desired news item. Furthermore, there will be more space in the newsletter for non-duplicative stores.

Figure 10:
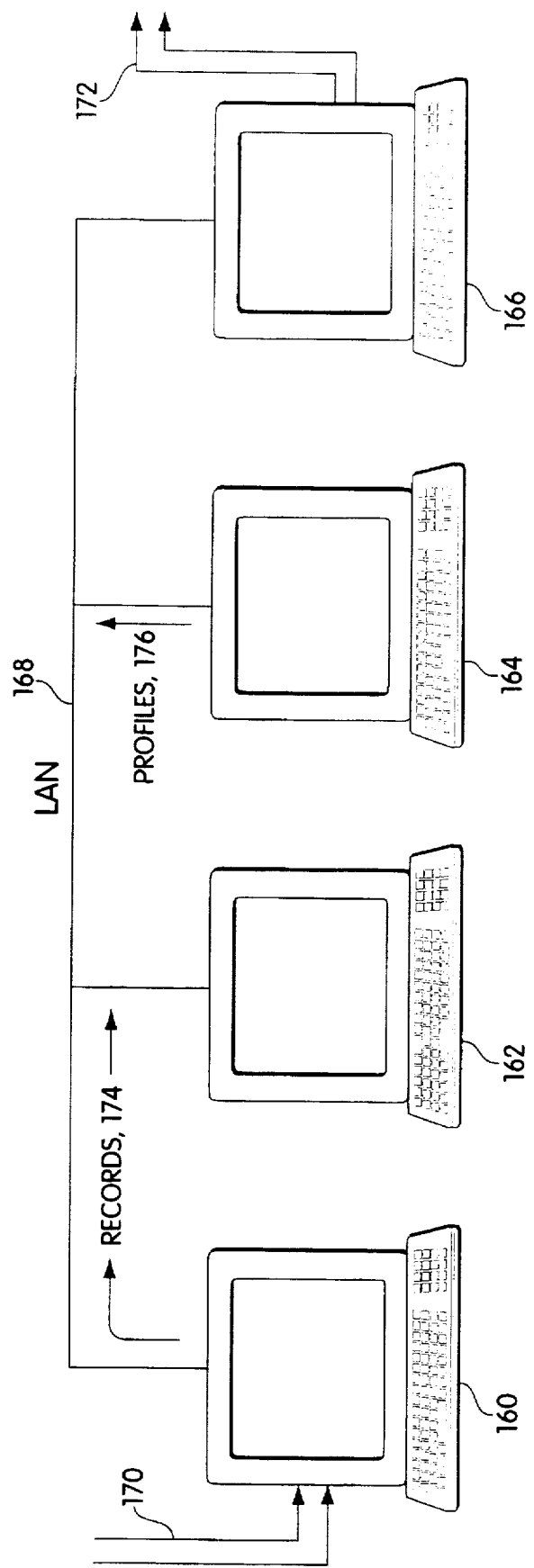
FIG. 10 is a block diagram illustrating a personal computer—local area network implementation according to the invention.

Referring to FIGS. 1 and 10, decisions to implement portions of the system as dedicated hardware or software modules are engineering decisions which depend on principally economic factors. The architecture shown in FIG. 1 along with the functionality described in the specification and flowcharts may be implemented on a series of personal computers 160, 162, 164, 166, connected to a local area network 168. Data feed personal computer 160 is connected to communication lines 170 from information providers, which may include leased phone lines, dial up phone lines, or FM reception hardware. This personal computer corresponds to the input processor of FIG. 1 and provides as its output received records 174. A general purpose UNIX workstation 162 is used as the system controller 20, record editor 22, associative processor 26, output manager 38, report generator 54, and associated storage. A profile generator personal computer 164 acts as the user manager and receives subscriber feedback and user profiles 176. An output processor 166 is connected to outgoing communication lines 172 such as facsimile lines, MCI mail lines, AT&T mail lines, Internet lines, or printer cables. It is observed that other personal computers may be added to the local area network in order to distribute functions more finely, to provide duplicative capabilities or even to break up certain functions. For example, in the embodiment of FIG. 1, the input processor, associative processor and output processor are represented by a series of blocks indicating that more than one processor is used for these functions. Of course, a variety of other combinations is possible. It is also observed that database storage in the system of the invention may be distributed across personal computers.

Figure 12:
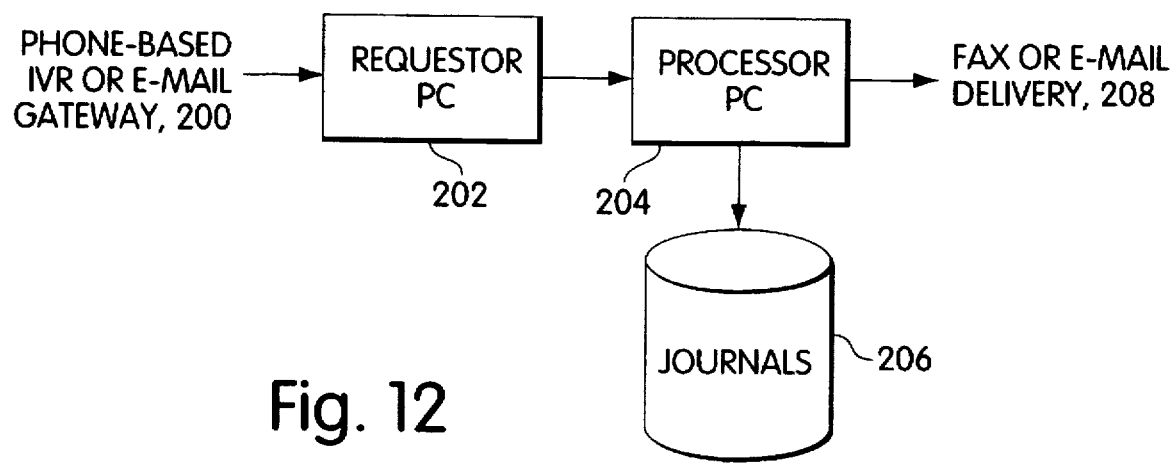
FIG. 12 is a block diagram illustrating a user manager of the textual record retrieval system according to this invention for tuning and redefining subscriber profiles based upon subscriber usage feedback.

Embodiments of the selective retrieval system of this invention can include enhancements to various aspects of the invention to fit more specific applications. Referring to FIG. 12 the user manager 30 of FIG. 1 can tune and redefine profiles based upon subscriber usage feedback. In one embodiment, a subscriber is provided with an issue including capsule summaries, or "briefs," of textual records, and may order full-text versions of the full textual records of interest to them. Delivery of the brief and full-text versions can be accomplished using electronic data services such as facsimile or E-mail. For example, the full textual record may be a news story, and the brief may be selected portions of the story such as the headline, selected sentences or an abstract.

A subscriber can read the brief and then order the full text record via, for example, a phone based interactive voice response (IVR) system or an E-mail gateway 200. Orders are received by a requestor PC 202. The full-text record requests are processed by the requestor PC 202 and sent to the processor PC 204 which in turn retrieves the requested full textual record from the appropriate electronic journal 206 and delivers the requested full-text record 208 to the requesting subscriber via facsimile or E-mail delivery 208.

The retrieval system of this invention features an intelligent process run by the user manager 30 for tuning and redefining subscriber profiles based on the subscriber's "usage feedback," which is developed by tracking the full-text record requests issued by the subscriber. In this manner, the usage feedback acts as an implicit, non-intrusive way for subscribers to let the system know which types of records they consider the most relevant. By ordering the full-text version of the record, a subscriber is implicitly stating the relevance of that record to his or her interests. When several records of the same type (i.e., from the same category structure) are ordered, the statement of that category structure's relevance to the subscriber becomes that much more powerful. If the particular category structure in question has originally been placed by the subscriber low in the profile priority, the automatic profile tuning and redefinition process of this invention raises the category structure in priority to give it more prominence in the records or briefs delivered each day.

The usage feedback from peers can also be used as input to the profile tuning and redefinition process of this invention. Peers can be defined by the number of category structures a set of subscribers have in common as part of their profiles. If one's peers are ordering a lot of full-text records from a particular category structure, this process will raise the category structure in the priority of the profiles belonging to all subscribers in the peer group.

Figure 13:
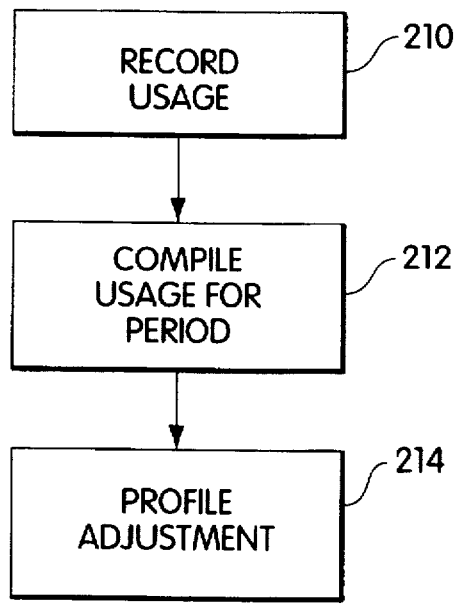
FIG. 13 is a flow chart illustrating a profile tuning and redefinition process performed by the user manager of FIG. 12.

Referring to FIG. 13, an embodiment of the profile tuning and redefinition process of this invention includes first, recording the subscriber usage data (step 210) in terms of full-text record requests from a subscriber received by the requestor PC 202 (FIG. 12) including, for example, subscriber; category structure of record; and time and date of the request. The process compiles the usage data (step 212) to give a complete usage picture for a given subscriber during a given period of time. Finally, the process compiles the usage data, compares the result with the subscriber's original profile and then adjusts the subscriber profile (step 214) accordingly. This process assumes that records are tracked by day and by category structure; full-text record retrievals are tracked by subscriber and by time period; and profile category structure priorities are tracked for each subscriber.

Figure 14:
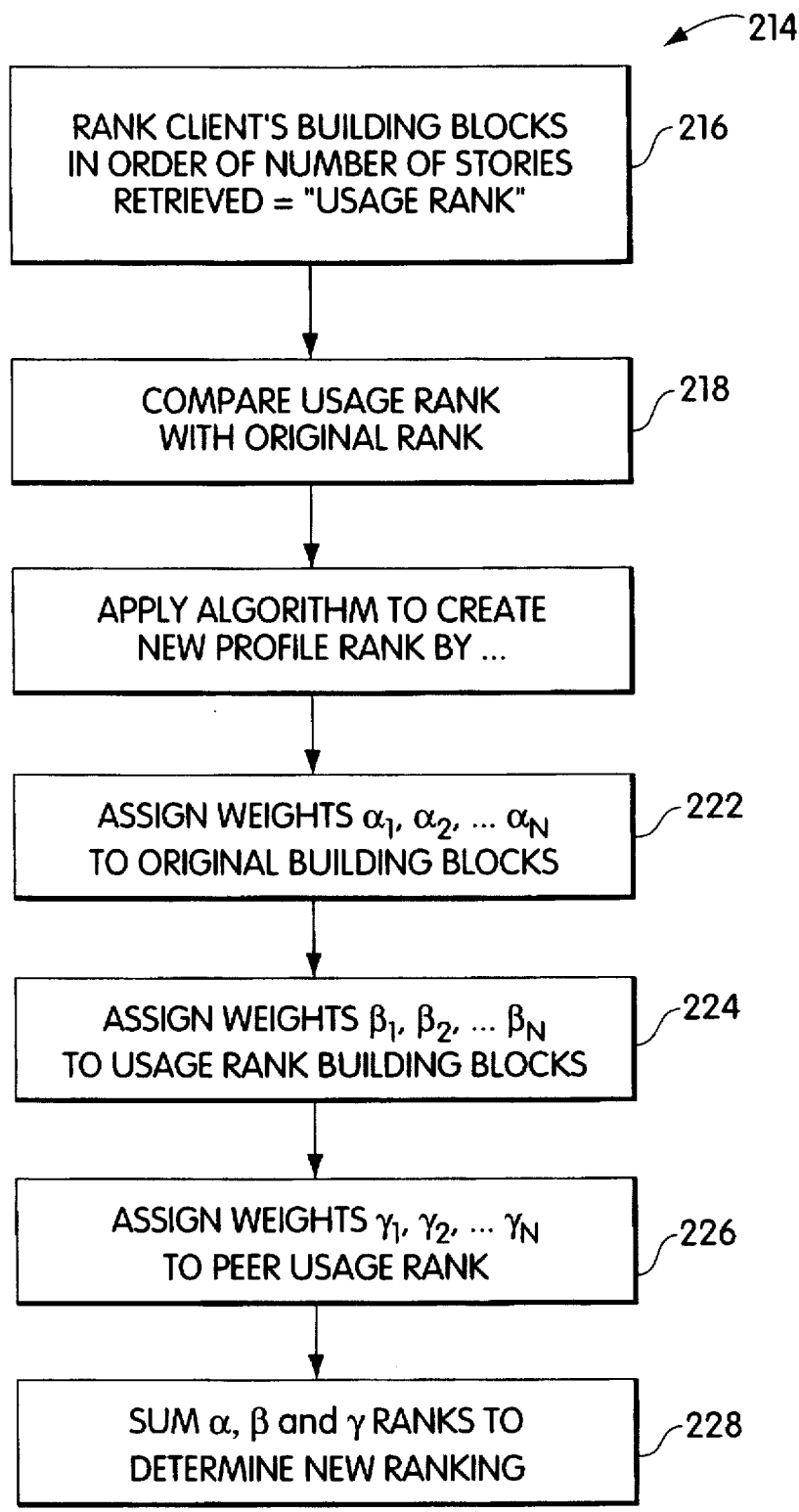
FIG. 14 is a flow chart detailing a profile adjustment process of the redefinition process of FIG. 13.

Referring to FIG. 14, the profile adjustment step 214 of FIG. 13 includes ranking a subscriber's category structures in order of the number of full-text records retrieved to determine a "usage rank" (step 216). The "usage rank" is compared with the original rank of the category structure (step 218). Next, a new profile rank is determined for each of N category structures by assigning rates $\alpha_1, \alpha_2, \ldots \alpha_N$ to the original category structures (step 222), assigning rates $\beta_1, \beta_2, \ldots \beta_N$ to the "usage rank" category structures (step 224) and assigning rates $\gamma_1, \gamma_2, \ldots \gamma_N$ to "peer usage rank" category structures (step 226). Finally, the new ranking for each category structure is determined by summing $\alpha$, $\beta$, and $\gamma$ ranks for that category structure to determine its new priority value (step 228). Rules can be applied to avoid wild swings in profile contents by for example, preventing a category structure from moving more than one place in priority for a given usage.

The record editor 22 of FIG. 1 can be enhanced to produce summary capsules, or "briefs," by automatically extracting the key text of a particular full-text record to serve as the capsules or "brief." For example, where the textual record is a news story, the brief can be one or more key sentences, the headline only, or the entire textual record, if small enough.

An embodiment of an automatic system of this invention for extracting the key sentences of a particular full-text record selectively extracts the sentences by source and editorial style. For example, where the full-text records are news stories, incoming news sources include newswires, newspapers, magazines, newsletters, and press releases, all written in different styles. This automatic system intelligently extracts the proper key sentences, which are effective for "brief" purposes, based on the editorial style of the particular source.

Referring to FIG. 15, the first part of the extraction process of this embodiment is to determine what the source is for each news story. This can include for example, newspapers 230, magazines and newsletters 232, newswires 234, or any number of other type of news sources. Once the source of the story has been determined, the process next determines the editorial style of the story itself. For example, whether the story is an abstract, event coverage, a press release, an analysis or some other identifiable type.

Once the source and editorial style have been determined, the process next looks at the story length, placement of key concepts and terms within the story, and also the placement of the story within the source (e.g., at the beginning or end of a magazine). Based on these data inputs, source, and editorial style, the process selectively creates the brief for the story. It should be noted that the same story, if appearing in more than one category structure, can yield different briefs based on the focus of the category structure where it appears.

For example, in determining the type of source, if the source is Businesswire, AP, or Reuters, then the type of source is determined to be a "newswire." If the source is PC Week, Health News Daily, EE Times or the like, then the source is determined to be a "magazine/newsletter." If the source is the Boston Globe, the Miami Herald, the New York Times, or the like, then the source type is determined to be a "newspaper."

In determining the editorial style of a story, if for example, the story is less than 300 words, then it is determined to be an "abstract." If the key concepts and terms are identified at the beginning of the story, then it is determined to be "event coverage." If product information is given at the beginning of a story, then it is determined to be a "press release." If key concepts and terms are discussed throughout the story then it is determined an "analysis."

To selectively extract the "brief" sentences, if for example, the story type is an "abstract," then the entire textual record can be taken for the "brief." If the story type is a "press release," then the opening few sentences of the article are sufficient to create the "brief." If the story is "event coverage" from a "newswire" or a "newspaper," then simply taking the title or headline can be a sufficient "brief." Finally, if it is determined that the story is an "analysis," then the "brief" can be created by taking sentences encompassing a concentrated cluster of key concepts and terms.

Figure 16:
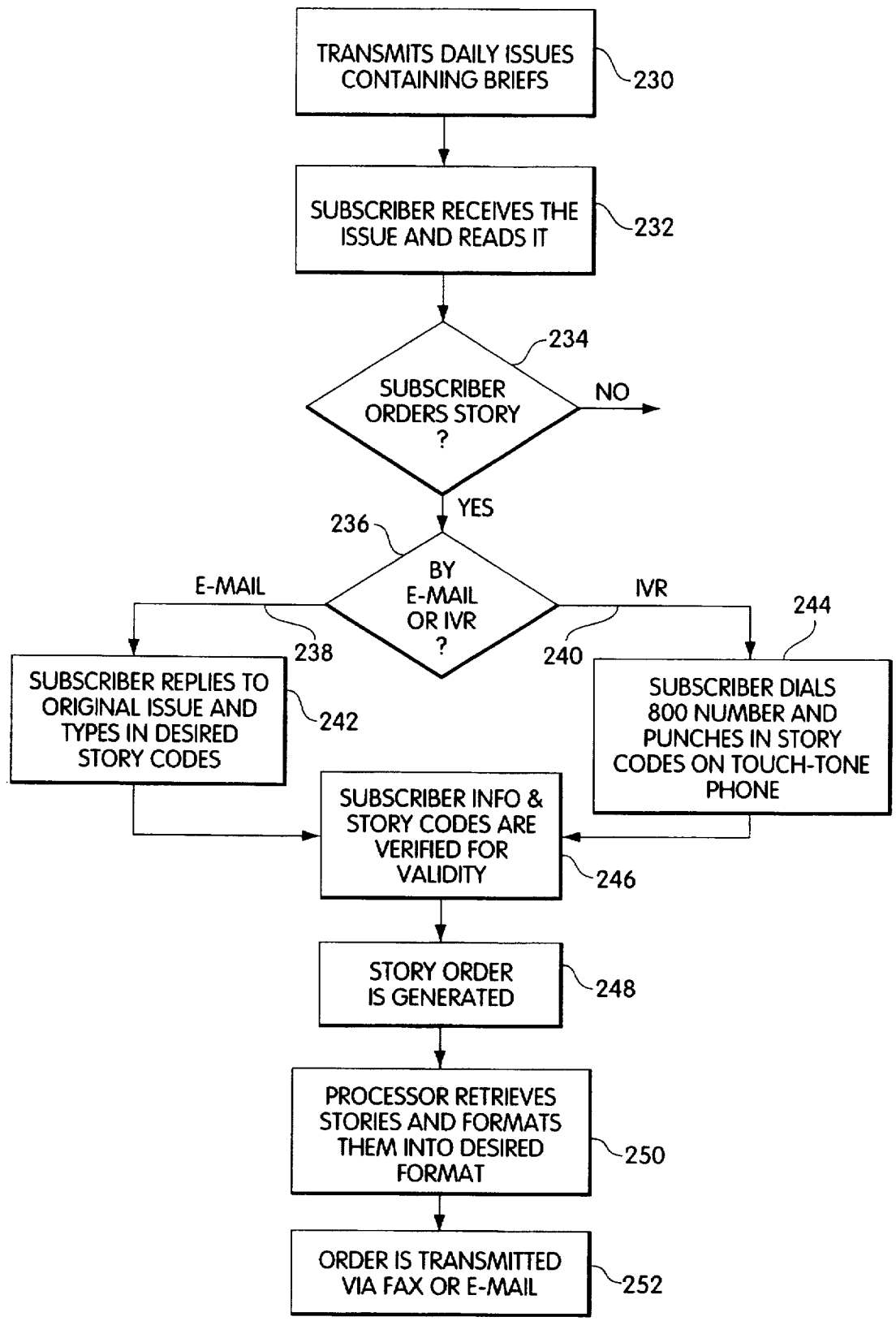
FIG. 16 is a flow chart illustrating a process for retrieving full text records requested by subscribers.

Referring to FIG. 16, subscribers can request a full-text record after receiving a "brief" of that record. First, a daily issue containing briefs selected using the subscriber profile is transmitted to the subscriber via facsimile, E-mail or another form of electronic transmission (step 230). The subscriber receives the issue, reads it (step 232) and determines whether or not to order a particular full-text record (step 234) corresponding to a brief received. In the event the subscriber decides to order a full-text record (step 236) then the subscriber has the option of ordering the record by either E-mail (step 238) or via a telephone interactive voice response (IVR) system (step 240) as described earlier with respect to FIG. 12. Other automated order filling systems may also be used. In the event the subscriber replies by E-mail, the subscriber simply replies to the received original E-mail issue and types the desired record codes (step 242) associated with each brief delivered. In the event the subscriber responds by IVR (step 240), the subscriber dials a telephone access number (e.g., a toll free 800 number) and punches in the record codes on a touch-tone telephone in response to automated voice instruction (step 244). The requestor PC (202 of FIG. 12) verifies the received subscriber information and record codes for validity (step 246). Once the order is verified for validity, the requestor PC generates a text record order (step 248) which is passed onto the processor PC (204 of FIG. 12) (step 248), which retrieves the full text records from the appropriate journal (206 of FIG. 12) and formats the record into the desired format for transmission (step 250). Next the processor PC forwards the formatted full-text record for transmission to the subscriber via facsimile or E-mail (step 252).

The selective text retrieval system of this invention allows subscribers to select the distribution of record types they receive in each daily issue, in the form of both full-text records and briefs. Each subscriber has his or her own unique preferences as to how this distribution should be done so the system can accommodate each subscriber's request. The distribution process takes into account both subscriber preferences and issue space allocation rules.

Figure 17:
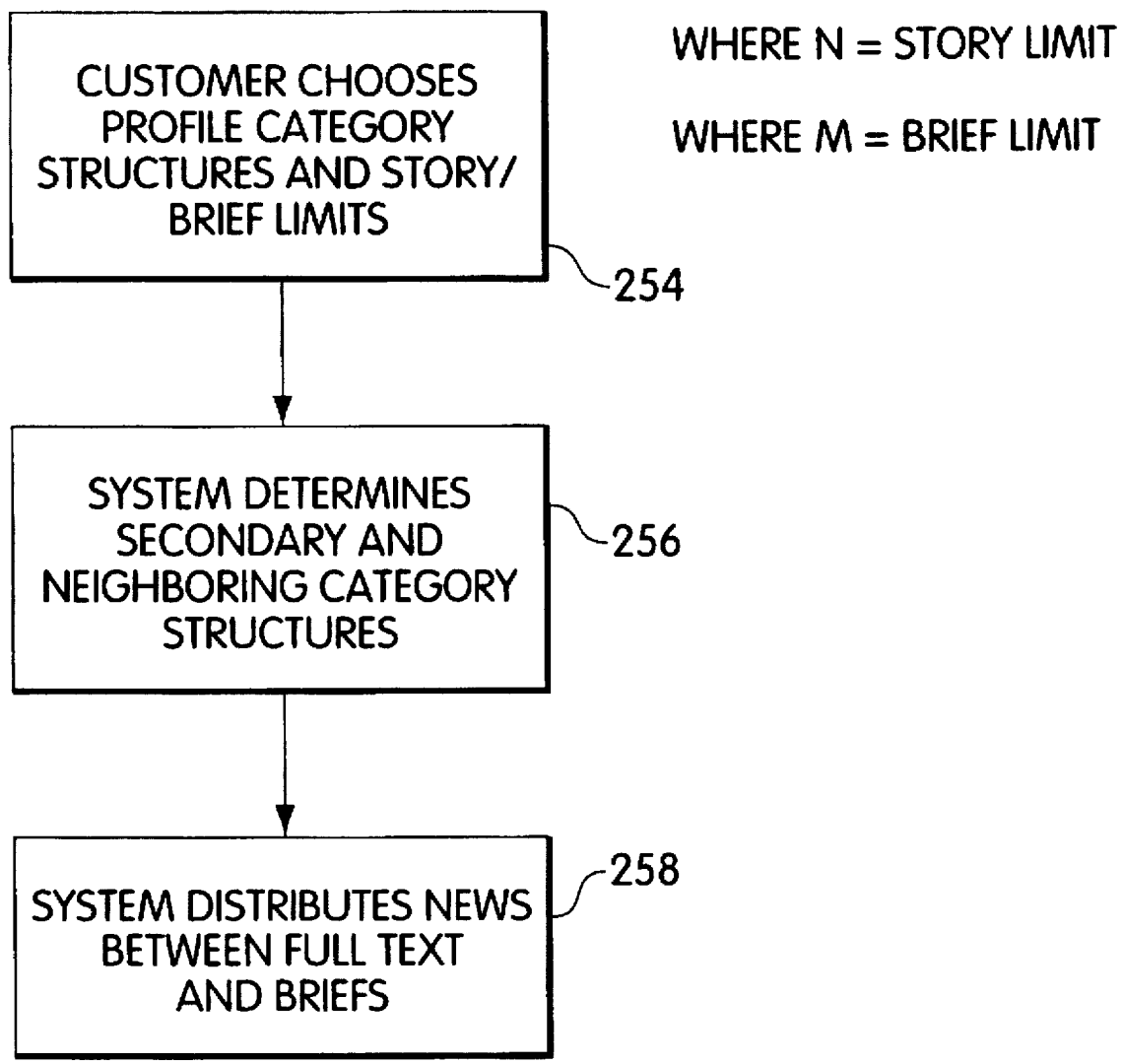
FIG. 17 is a flow chart illustrating a process for determining the distribution of retrieved textual records between full textual records and brief textual records.

Referring to FIG. 17, an embodiment of this process begins with each subscriber creating a profile by choosing relevant category structures (their "primary category structures") for their own interests. Each subscriber determines the maximum number of full-text records and the maximum number of briefs they want to receive each day (step 254) to determine their "full text limit" and "brief limit," respectively. Next the process continues with the system determining "secondary category structures" and "neighboring category structures" (step 256) for use by the system on days when record volume is low (e.g., a slow news day) as received from information providers. Secondary category structures are user defined lower priority categories for a user's profile, and neighboring categories are system defined categories of related subject matter. Both contain records that, while not of primary interest to the subscriber, are still relevant to the subscriber. Finally, the process distributes records between the full text and briefs according to the "full text limit" and "brief limit" set by the subscriber and the availability of full-text records in each of the primary, secondary, and neighboring category structures (step 258).

The "full text limit" can be filled as follows, where N=full text limit. First a priority order is defined by determining the number of full-text records available in each of the primary, secondary, and neighboring category structures. Values for each of these quantities can be assigned as $\alpha$=Number of full text records in the primary category structure;

$\beta$=Number of full text records in the secondary category structure; and $\gamma$=Number of full text records in the neighboring category structure.

If the "full text limit" N is less than $\alpha$, then the full text limit is filled with primary full-text records. Otherwise, if full text limit N is greater than $\alpha$ but less than $\alpha+\beta$, then the full text limit is filled by adding records from the secondary category structures. Otherwise, if the full text limit N is greater than $\alpha+\beta$ but less than $\alpha+\beta+\gamma$, then the "full text limit" is filled by adding records from the neighboring category structures as well as secondary category structures.

The process for filling the "brief limit" is similar, and picks up where the "full text limit" leaves off. For example, if the primary category structures have 10 records and the "full text limit" N equals 7, then the briefs begin with record number 8. If then, for example, the "brief limit" equals 5, the process will take the remaining 3 primary records, then add two more from secondary category structures first and neighboring category structures last.

The selective text retrieval system of this invention also allows automatic category structure fusion and sectioning to treat category structures as dynamic entities and update them to avoid having stale or out-of-date category structures. The process of this invention can merge or "fuse" category structures having overlapping contents into a single, more robust category structure. Alternatively, the process can split or "section" existing category structures which may be too large or too broad, into separate, more distinct category structures. Each new category structure created through fusion or sectioning is associated with a new SMART vector for pointing to the structure.

Figure 18:
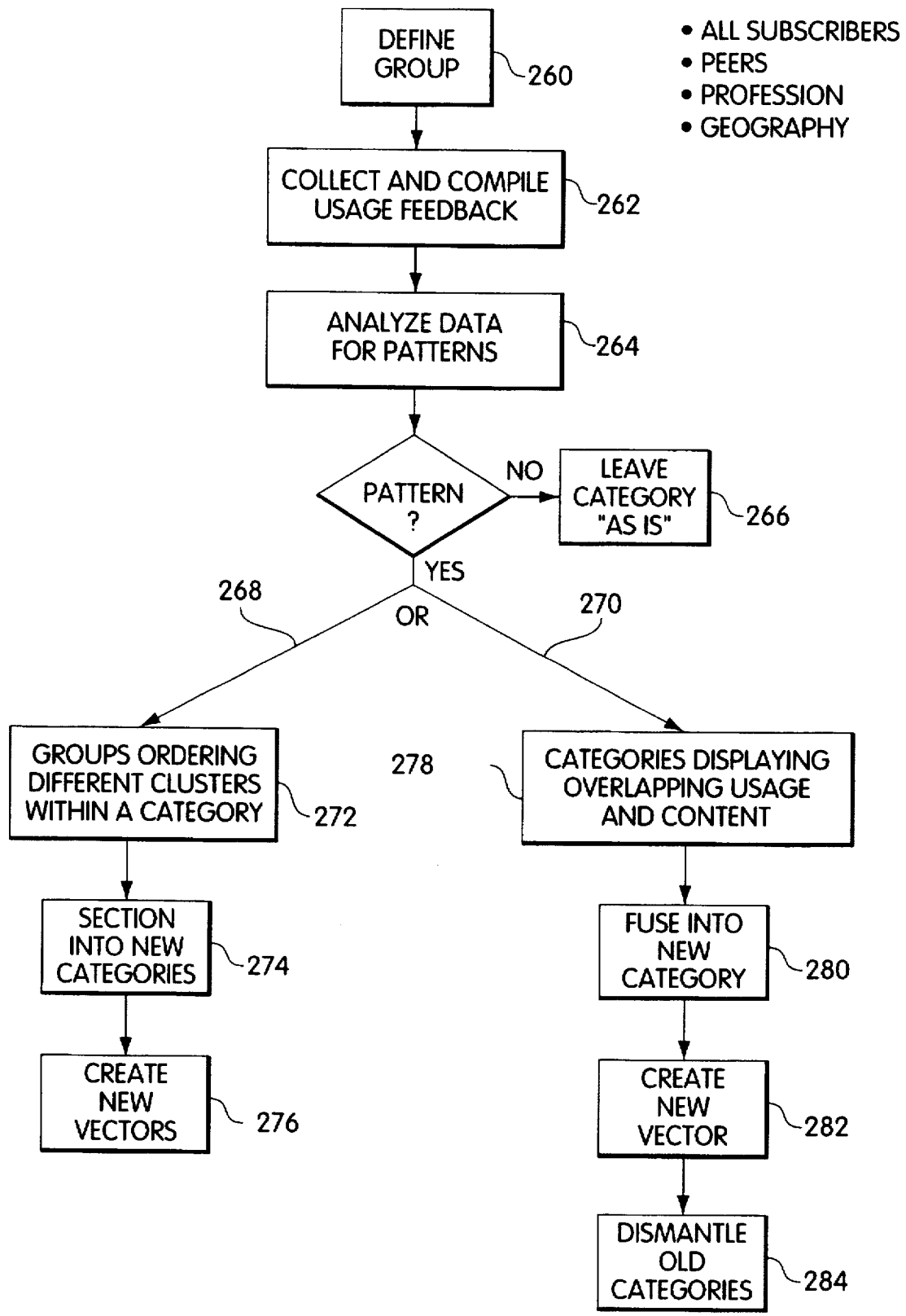
FIG. 18 is a flow chart illustrating a process for sectioning or fusing of category structures dependent on usage feedback of textual records by defined groups of subscribers.

Referring to FIG. 18, an embodiment for the process of this invention for fusing or sectioning category structures begins by defining a group (step 260) of subscribers to provide usage feedback to be used in the fusion or sectioning process. Such groups include, for example, peers such as subscribers sharing the same profession; subscribers with similar profile content; subscribers having similar geographic location; etc. The group can also be defined as all subscribers. The selective group's full-text record request activity, or "usage feedback," is then collected, compiled, (step 262) and analyzed (step 264) for any of a number of usage patterns. If no usage patterns are recognized, then the category structures are left as is (step 266). If particular usage patterns are recognized, then an appropriate separation process (step 268) or fusion process (step 270) can be applied to the category structures.

If, for example, the pattern analysis recognizes different groups ordering different clusters of full text records within the same category structure (step 272) the separation process can be applied (step 368). The category structure is sectioned into new category structures (step 274) associated with particular groups, each new category structure containing only those records of the original category structure that have high usage for the individual groups. Finally, a new SMART vector is created (step 276) to link the profiles of subscribers in a particular group to the new category structure formed for that group from the original category structure.

Figure 19:
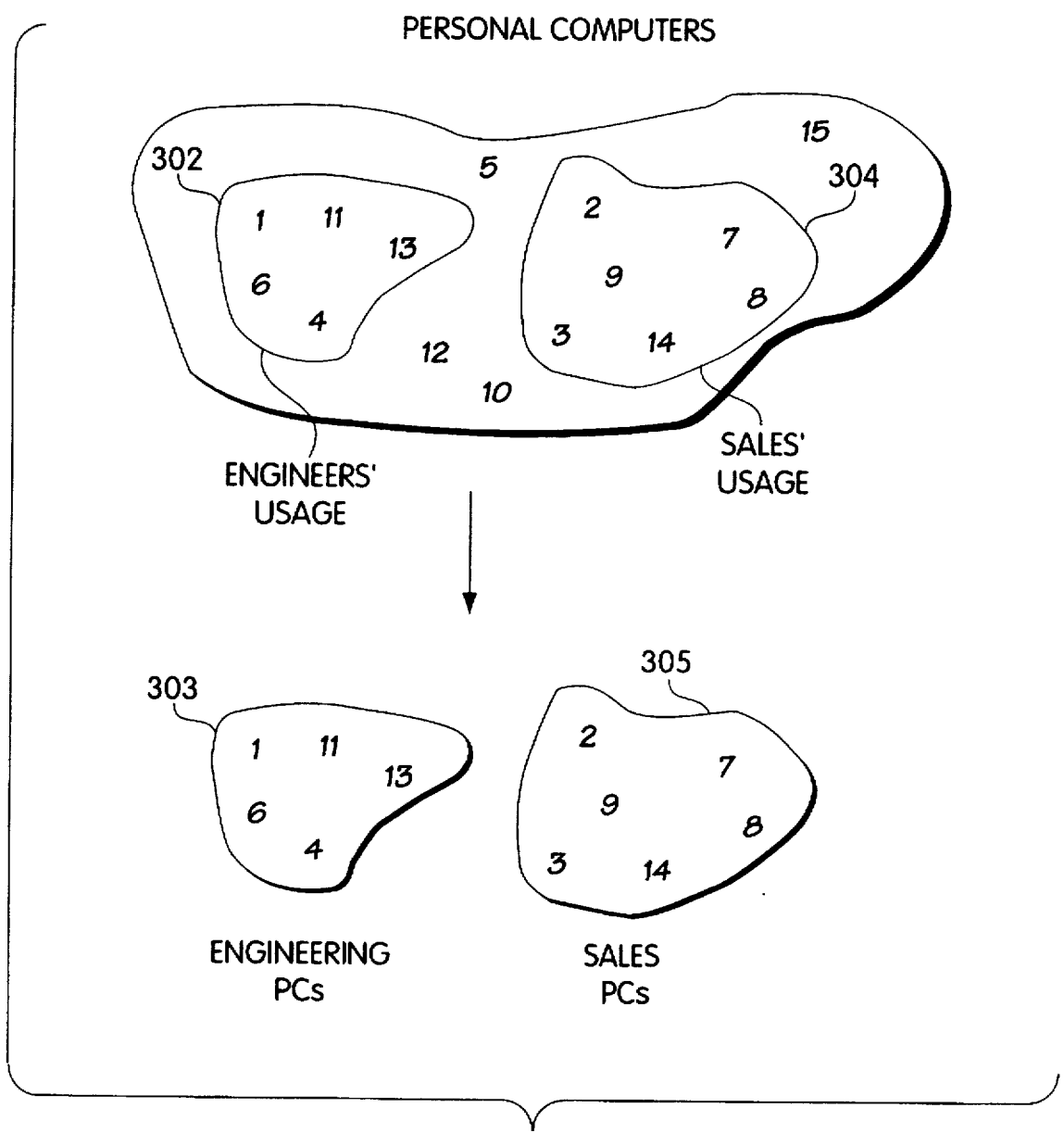
FIG. 19 is a diagram illustrating the separation of a single category structure into two new category structures.

Referring to FIG. 19, there is shown an example of a category structure sectioned by the process of this invention into smaller category structures, each associated with subscribers belonging to a particular group. For example, category structure 300 may be defined broadly as "personal computers" and contain records here numbered 1–15. Through usage analysis of this invention it is determined that subscribers belonging to a group defined as "engineers" and having "personal computers" as part of their profile, have a heavy usage pattern for elements 1, 4, 6, 11 and 13 of the "personal computers" category structure. Subscribers who can be grouped as "sales personnel", and also have the "personal computers" category structure as part of their profile show a high usage of elements 2, 3, 7, 8, 9, and 14 of the "personal computers" category structure. As a result of this process the elements belonging to the "engineers" group category structure 302 are separated to create a new category structure 303 for "engineering," and the elements of the "sales personnel" category structure 304 are separated to create a new category structure 305 for "sales personnel." Thus, each subscriber in either the "engineers" or "sales personnel" group now has a "personal computers" structure more tailored for their engineering or sales interests.

Referring again to FIG. 18, if the pattern analysis of this process indicates an overlapping usage and content pattern (step 278), a fusion of category structures should take place (step 270). The fusion process combines the overlapping elements into a new category structure (step 280) creating a new SMART vector pointer to the category structure (step 282) for each subscriber of the category structures prior to fusion, and then proceeds to dismantle the old category structures (step 284).

Figure 20:
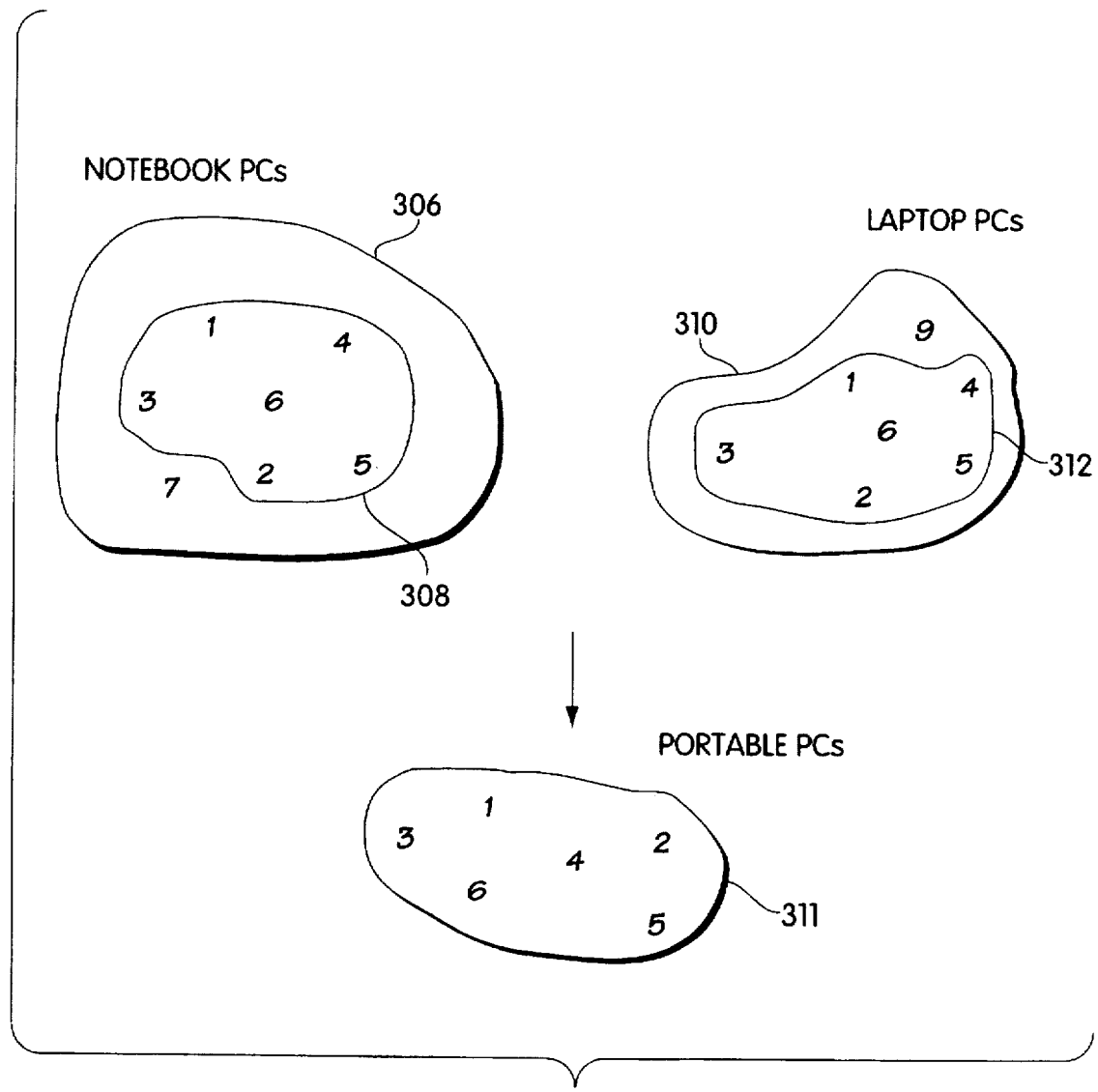
FIG. 20 illustrates the fusion of two category structures into a single new category structure.

Referring to FIG. 20, there is shown an example of fusion of two category structures containing a substantial number of overlapping records into a new single category structure. For example, category structure "notebook PC" 306 contains a group of elements 308 numbered 1–6, 7. Another category structure "laptop PC" 310 contains a group of elements 312 numbered 1–6, 9 which overlap the elements of group 308 of the "notebook PC" category structure 306. The result of this process is the fusion of the "notebook PC" category structure 306 with the "laptop PC" category structure 310 into a new category structure 311 entitled "portable PC" encompassing all of the elements of each of the contributing groups 308 and 312.

The automatic textual retrieval system of this invention also includes a process for enlightening subscriber profiles through the introduction of peripheral category structures into their profile from time to time. Subscribers initially create their own profiles by selecting their relevant areas of interest. As time passes, they refine their profiles directly through relevance feedback, and usage feedback by ordering full-text records from delivered briefs. From each method the subscriber indicates what they like or dislike of what they have received. However, no such feedback is available about records subscribers did not receive. To avoid myopic or "tunnel vision" profiles, the automatic textual retrieval system of this invention provides a process for occasionally introducing, at defined times or randomly, peripheral category structures into a subscriber's profile to determine if the subscriber's interests are expanding into these peripheral areas. In this way, subscribers get to sample, on a limited basis, emerging fields and have their profiles "enlightened" automatically.

In general, the profile enlightenment process of this invention can become operational when incoming traffic volume from information providers is low (e.g., slow news days). When this occurs and a profile cannot be filled with primary category structures, the process utilizes the records from neighboring category structures, which are continuously kept up-to-date in profile databases. The process, in a sense, makes the presumption of sending marginal or peripheral records/briefs to a subscriber to see if those types of records are becoming of interest. If the subscriber then confirms the system's presumption by ordering full-text records from these peripheral areas, the category structures containing those stories are added to the subscriber's profile to "enlighten" the profile.

Figure 21:
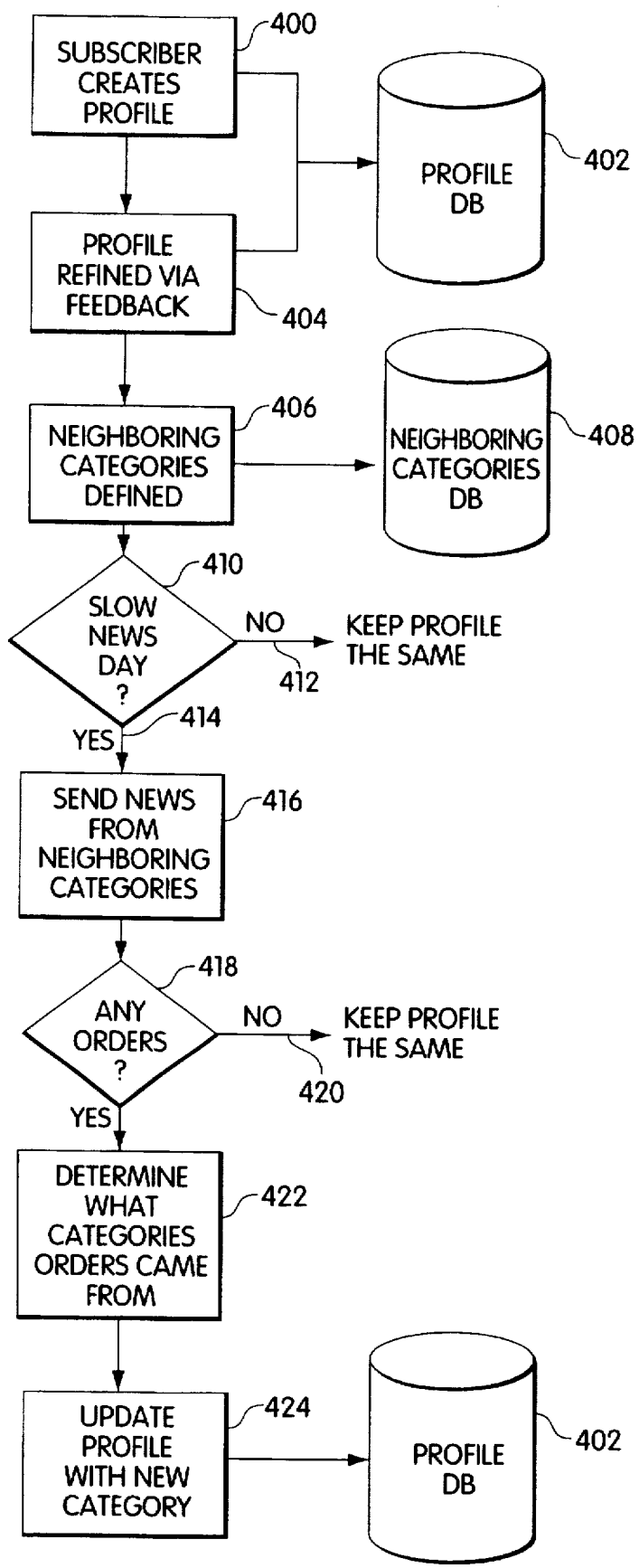
FIG. 21 is a flow chart illustrating a process for enlightening a subscriber profile through sampling of textual records of neighboring category structures.

Referring to FIG. 21, an embodiment of the profile enlightenment process of this invention begins with the subscriber creating a profile (step 400) which is stored in a profile database 402 and is continually refined via direct relevance feedback or usage feedback (step 404). Neighboring category structures are defined (step 406) with regard to a particular subscriber profile and are stored in a neighboring category structure database 408. The process next determines whether or not record traffic volume is low (step 410) based on the records received from information providers. In the case where there is sufficient record volume to satisfy the subscriber's profile (step 412) the subscriber profile is kept the same. In the case where there is insufficient record volume to satisfy the subscriber's profile (step 414) then record briefs are provided to the subscriber from neighboring category structures (step 416). The process next determines if the subscriber orders any full-text records from the neighboring category structures (step 418). If no full-text record orders from the neighboring category structures are received from the subscriber (step 420), the subscriber profile is kept the same. If full-text record orders are received from the subscriber, and are determined to have come from the neighboring category structures (step 422) then the subscriber's profile is updated with the new category structure (step 424) and the updated profile is stored to the profile database (step 426). Thus, the subscriber profile has been updated to include neighboring category structures in which the subscriber has shown an interest.

Embodiments of the selective textual retrieval system of this invention can also include enhanced customization and duplicate elimination based upon text record contents and attributes. A subscriber can define certain attributes such as publications, authors, editorial style, publication costs, etc. that the subscriber always wants to see, or always wants to discard. This process is especially effective in cases where there are several treatments (duplicates) of a certain event from different sources. Through attribute selections, different subscribers can receive different treatment of the same event, instead of relying on the system to determine the best treatment for them. In other cases, a subscriber may want to see all treatments of a particular event or related to a particular party from all sources (e.g., where a public relations department may want to track all treatments of a particular client by the press).

Figure 22:
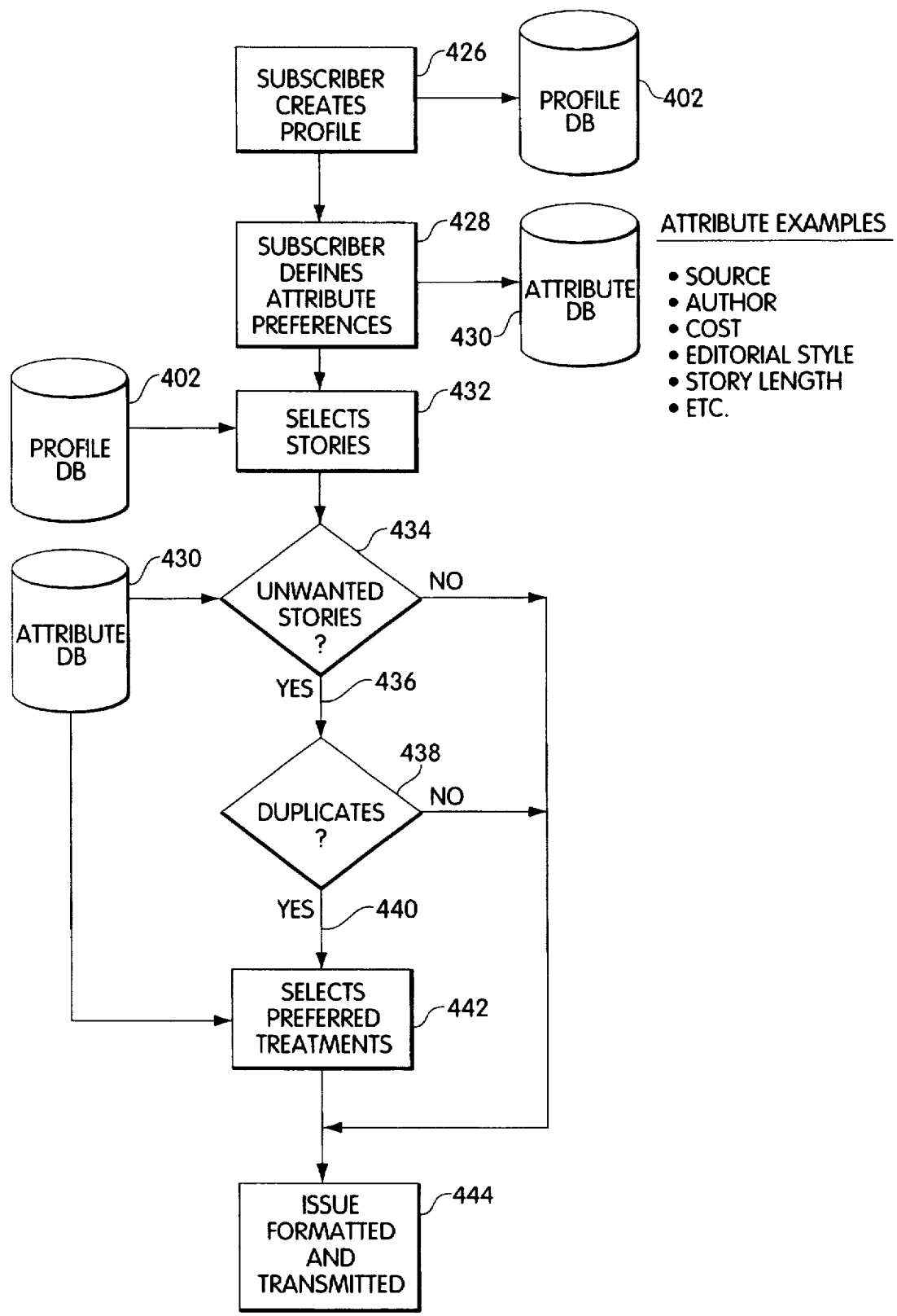
FIG. 22 is a flow chart illustrating a process for selecting textual records in accordance with defined attribute preferences.

Referring to FIG. 22, an embodiment of the enhanced customization and duplicate elimination process of this invention begins when the subscriber creates a profile of category structures (step 426) which is stored to profile database 402. At that time the subscriber also describes attribute preferences, (step 428) such as to source, author, cost, editorial style, record length, etc., which are stored to an attribute database 430. The process proceeds to select records for the issue (step 432) based upon the profile database 402. The process then checks for unwanted records associated with category structures (step 434) based upon the subscriber-selected attributes stored in the attribute database 430. If no unwanted records are found based on the attributes, then the issue is formatted and transmitted to the subscriber (step 444) with the selected records. If unwanted records are found to be present in the selected records (step 436) then the process checks to determine whether duplicates (i.e. different treatment of the same event) are available (step 438). If no duplicates are available then the unwanted record is selected and the issue is formatted and transmitted (step 444) including the unwanted record. In the case where duplicates are available (step 440) then the process selects the preferred treatment (step 442) based on the subscriber defined attributes stored in the attribute database 430 to replace the unwanted record. Once the selected preferred record is substituted for the originally selected record, the issue is formatted and transmitted (step 444). Thus, the subscriber receives only preferred treatments of particular events if and when duplicate treatments, more preferable than the original record selected, are available.

Embodiments of the selective retrieval system of this invention can also include a tagged "data pipe" for electronic and on-line environments which offer customized data retrieval to subscribers via an electronic or on-line gateway. In this manner subscribers gain the benefit of immediate access to full-text records of interest by simply selecting the record on-line via an intelligent subscriber interface. This approach also has the benefit of having the majority of the computing power required for such retrieval located at the on-line service provider site rather than the subscriber's site which can give the subscriber exceptional value at low cost.

Rather than transmitting individual records on a point-to-point basis to each subscriber, the records are sent to on-line service providers via a "data pipe" tagged with all the necessary components and attributes required for automated retrieval. Using an interface set up on the subscriber system, the subscriber can define his or her own profile and preferences and receive the records interactively. Records can be retrieved by headline, brief, or full text. Subscribers can filter out particular records based on certain attributes. An entire scope of information is available to the subscriber by simply changing their profile, preferences and attributes in real time.

Figure 23:
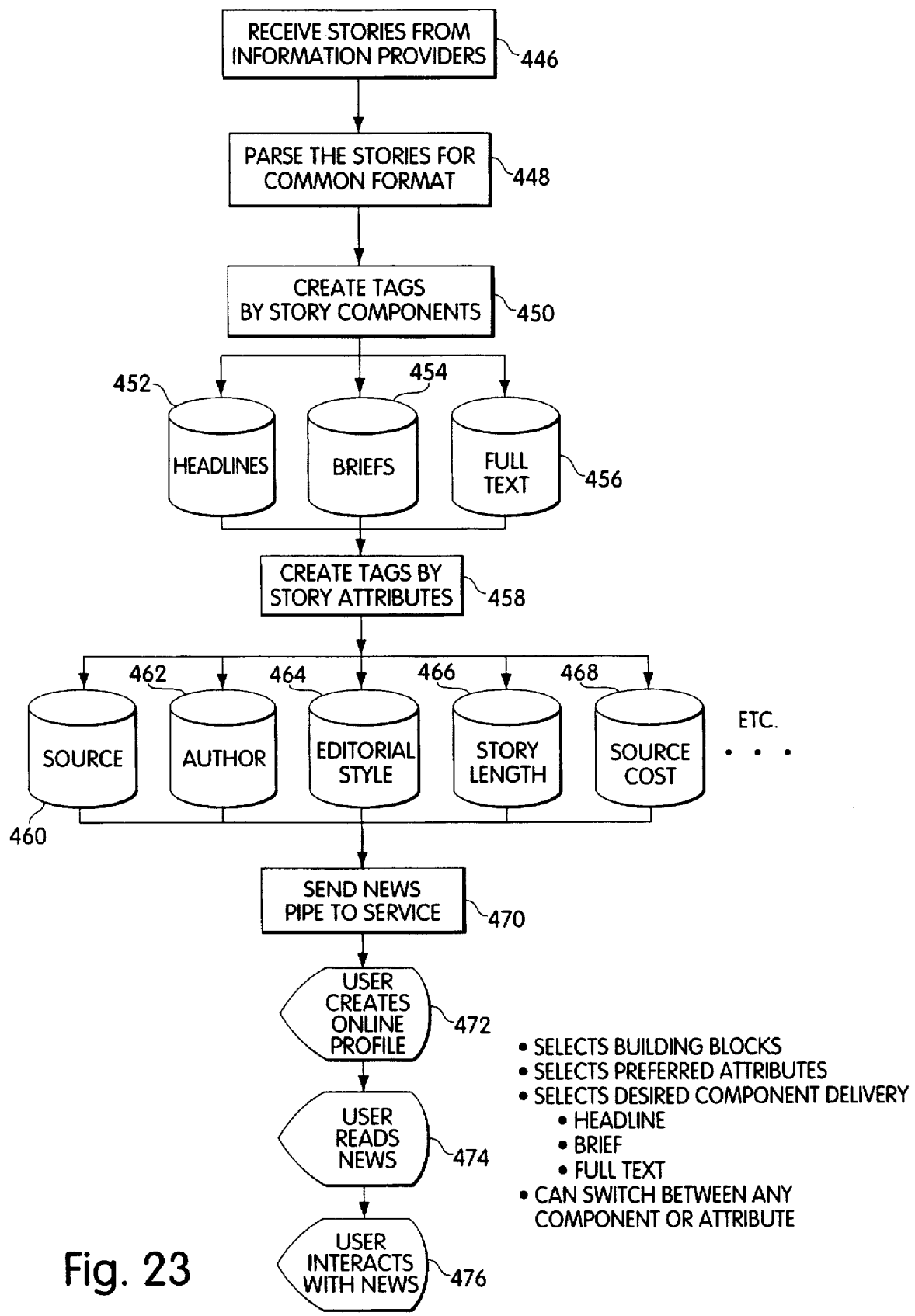
FIG. 23 is a flow chart illustrating a process for the delivery of data to on-line subscribers by means of a data pipe.

Referring to FIG. 23, an embodiment of a process for delivering a tagged "data pipe" featuring, for example, news stories (i.e., a "news pipe") to electronic and on-line environments includes receiving the news stories from the information provider (step 446), parsing the stories for a common format (step 448), and creating tags by story components (step 450), including, for example, headline tags 452, brief tags 454, and full text tags 456. Next, the process creates tags for attributes (step 458) including for instance, the story source 460, author 462, editorial style 464, story length 466, source cost 468, etc. Next, the tagged stories are sent via a "news pipe" to on-line service providers (step 470). On-line subscribers create on-line profiles (step 472) by, for instance selecting category structures, preferred attributes, and desired component delivery (i.e. headline, brief, or full text record). The subscriber can read the news (step 474) as selected by the profile, and can interact with the news (step 476) by adjusting their profile, desired components, or attributes. Thus, the subscriber has a full range of news available to them on a fully interactive and customizable basis.

Embodiments of the selective retrieval system of this invention can also include a process which selects a collection of records containing relevant information about any of a specified set (a "portfolio") of companies or other named entities from a larger set of records whose content may be either relevant or nonrelevant to the portfolio. The relevant information can include the full set of records relevant to the companies or named entities in the portfolio, or a subset of those records determined by additional subject matter criteria.

Figure 24:
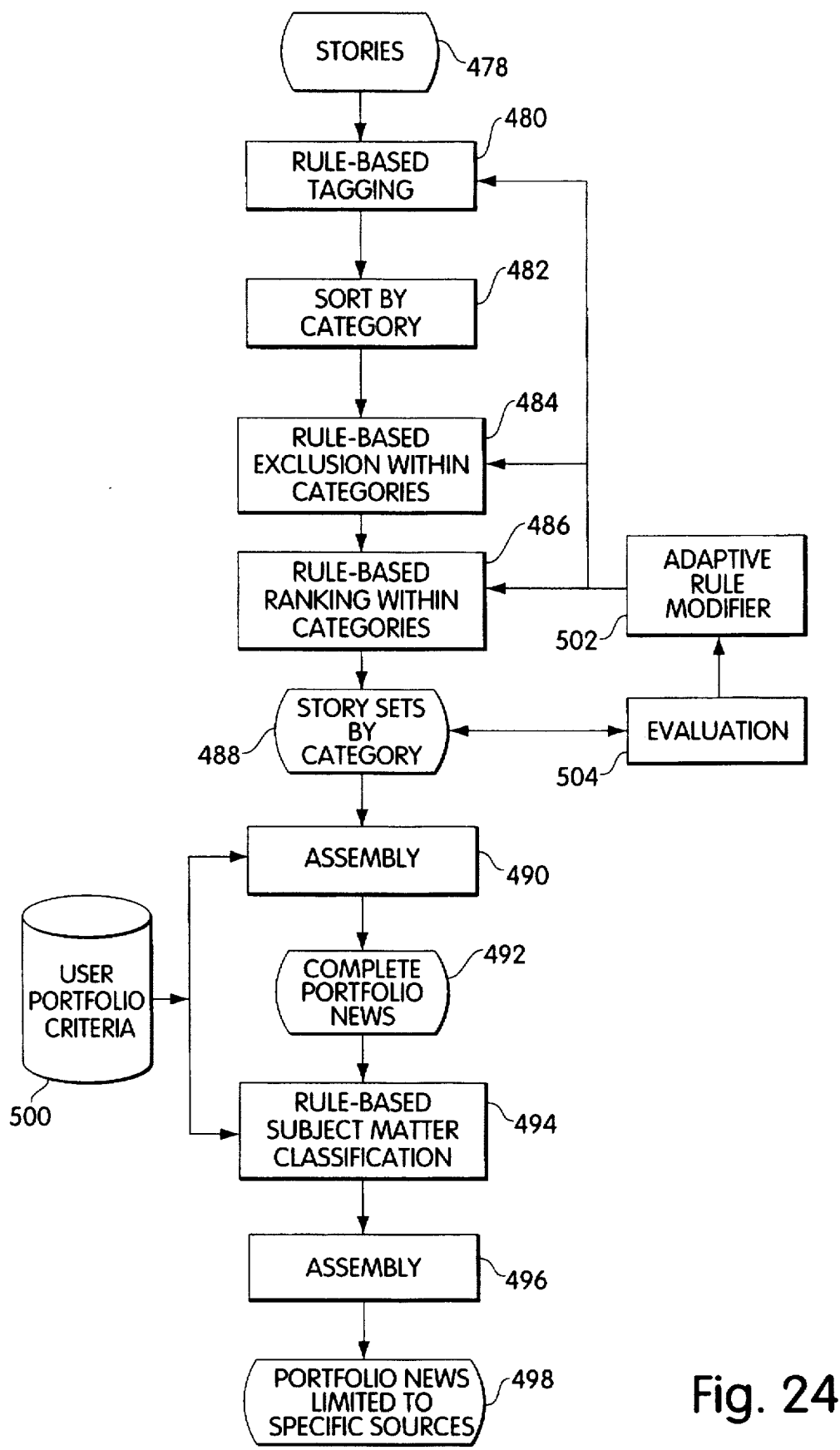
FIG. 24 is a flow chart illustrating a process for rule based portfolio tracking.

Referring to FIG. 24, the portfolio tracking process includes a multi-stage, rule based system that attaches one or more tags to a record corresponding to each company or named entity that is part of the record's content. The records are collected (step 478) and rule-base tags (step 480) are attached to the records corresponding to each company or named entity that is part of the record's content. For instance, "Sun Microsystems" and "Sun Oil" tags may be attached to a record that contains the occurrence, "Sun". The tagged records are then sorted into categories based on the tags applied (step 482), with one category assigned for each of the companies or named entity. A rule-based exclusion is applied within categories (step 484) to exclude specific records from some or all categories. For instance, if a record previously tagged with a "Sun Microsystems" tag does not contain computer terms and/or concepts and does contain petroleum-related terms and/or concepts, then the "Sun Microsystems" tag is deleted and the record is excluded from the Sun Microsystems category.

The record set for each category is then passed through a third stage that ranks each retained record within each category (step 486). The record sets by category are collected (step 488) and evaluated (step 504) for relevance and ranking order. This order may be determined by the frequency and/or position of occurrences of the representations of the companies or named entities. Sets of these categories may be assembled (step 490) according to user-defined criteria (step 500) to form "complete record" portfolios 492 of company or named entity news. The portfolios 492 may then be further qualified according to specific user-defined subject matter (e.g., earnings, personnel, mergers & acquisitions, etc.).

The evaluated output of the system may also be passed to an adaptive rule modifier (step 502) and used to add, delete, or modify the tagging 480, exclusion 484, and ranking 486 rules.

The invention may be embodied in other specific forms without departing from the essential characteristics thereof. Accordingly, the invention is to be defined not by the preceding description, which is intended as illustrative, but by the claims that follow.

What is claimed is:

1. A method of extracting a preferred set of stored textual records from a database, comprising the steps of:

assigning, to selected ones of a plurality of predefined category structures, a priority value, wherein said selected ones of said plurality of predefined category structures and assigned priority values form a profile associated with a subscriber;

assigning to each stored textual record a relevance value associated with each category structure;

associating each stored textual record with each category structure for which the record's relevance value associated with that category structure exceeds a predetermined threshold;

maintaining, for each category structure, a list of associated textual records;

retrieving from the database, for each selected category structure, the textual records associated with that category structure;

selecting, from the set of retrieved textual records, a plurality of preferred textual records in a manner responsive to the priority value assigned to each category structure;

assembling the plurality of preferred textual records to form the preferred set;

collecting usage information from the subscriber for the retrieved textual records forming the preferred set; and assigning a new priority value for category structures associated with said profile based on the usage information collected for said subscriber associated with the profile, said step of assigning a new priority value comprising:

ranking the category structures in order of subscriber usage of textual records associated with the category structures to determine a usage rank for each category structure; and comparing the usage rank with the original priority value for each category structure to determine the new priority value for the category structures, said step of comparing comprising:

assigning a first numerical weight to each category structure determined by its original priority value in the associated profile;

assigning a second numerical weight to each category structure determined by the usage of textual records associated with the category structure by the subscriber;

assigning a third numerical weight to each category structure determined by the usage of the textual records associated with the category structure by other subscribers previously determined to be peers; and assigning the new priority value for each category structure determined by summing the first, second and third numerical weights assigned for each category structure.

2. A method of extracting a preferred set of stored textual records from a database, wherein the stored textual records include full textual records and brief textual records and each brief textual record is associated with a full textual record, comprising the steps of:

assigning to selected ones of a plurality of predefined category structures, a priority value, wherein said selected ones of said plurality of predefined category structures and assigned priority values form a profile associated with a subscriber;

extracting a brief textual record from a full textual record, said extracting step comprising:

determining the source of the full textual record;

selectively extracting portions of the full textual record to provide the brief textual record depending on the source and the length of the full textual record, wherein this selectively extracting step includes extracting the entire full textual record to provide the brief textual record if the length of the full textual record is less than a predetermined value;

assigning to each stored textual record a relevance value associated with each category structure;

associating each stored textual record with each category structure for which the record's relevance value associated with that category structure exceeds a predetermined threshold;

maintaining, for each category structure, a list of associated textual record;

retrieving from the database, for each selected category structure, the textual records associated with that category structure;

selecting, from the set of retrieved textual records, a plurality of preferred textual records in a manner responsive to the priority value assigned to each category structure;

assembling the plurality of preferred textual records to form the preferred set;

collecting usage information from the subscriber for the retrieved textual records forming the preferred set, the usage information including subscriber usage of full textual records; and assigning a new priority value for category structures associated with said profile based on the usage information collected for said subscriber associated with the profile.

3. A method of extracting a preferred set of stored textual records from a database, wherein the stored textual records include full textual records and brief textual records and each brief textual record, is associated with a full textual record, comprising the steps of:

assigning, to selected ones of a plurality of predefined category structures, a priority value, wherein said selected ones of said plurality of predefined category structures and assigned priority values form a profile associated with a subscriber;

extracting a brief textual record from a full textural record, said extracting step comprising:
  determining the source of the full textual record;
  identifying the location of key terms in the full textual record;
  selectively extracting portions of the full textual record to provide the brief textual record depending on the source of and the identified key terms in the full textual record, wherein this selectively extracting step includes extracting one or more sentences proximal to, and including, the identified key terms to provide the brief textual record;
assigning to each stored textual record a relevance value associated with each category structure;
associating each stored textual record with each category structure for which the record's relevance value associated with that category structure exceeds a predetermined threshold;
maintaining, for each category structure, a list of associated textual records;
retrieving from the database, for each selected category structure, the textual records associated with that category structure;
selecting, from the set of retrieved textual records, a plurality of preferred textual records in a manner responsive to the priority value assigned to each category structure;
assembling the plurality of preferred textual records to form the preferred set;
collecting usage information from the subscriber for the retrieved textual records forming the preferred set, the usage information including subscriber usage of full textual records; and
assigning a new priority value for category structures associated with said profile based on the usage information collected for said subscriber associated with the profile.

4. A method of providing textual records from a database to a subscriber comprising the steps of:
  assigning a priority value to selected ones of a plurality of predefined category structures to form a profile associated with a subscriber;
  assigning to each stored textual record a relevance value associated with each category structure;
  associating each stored textual record with each category structure for which the record's relevance value associated with that category structure exceeds a predetermined threshold;
  providing a brief textual record associated with each of the stored textual records, wherein the brief textual record comprises an extracted portion of the stored textual record with which it is associated;
  retrieving from the database, the brief textual records associated with the stored textual records associated with each category structure, the selection of particular brief textual records retrieved being responsive to the assigned priority values associated with the profile;
  assembling the brief textual records retrieved from the database to form the preferred set;
  transmitting the preferred set of assembled textual records to the subscriber;
  receiving requests from the subscriber for the stored textual records associated with one or more brief textual records of the preferred set; and
  retrieving the requested stored textual record from the database and transmitting the retrieved stored textual record to the requesting subscriber, this retrieving step comprising:
    providing a stored textual record limit and a brief textual record limit;
    retrieving a plurality of stored textual records up to the stored textual record limit by first retrieving a plurality of stored textual records from the associated category structures, and then, if the retrieved stored textual records number less than the stored textual record limit, then retrieving stored textual records from other category structures up to the stored textual record limit; and
    retrieving a plurality of brief textual records up to the brief textual record limit.

5. A method of extracting a preferred set of stored textual records from a database, comprising the steps of:
  assigning, to selected ones of a plurality of predefined category structures, a priority value, wherein said selected ones of said plurality of predefined category structures and assigned priority values form a profile associated with a subscriber;
  assigning to each stored textual record a relevance value associated with each category structure;
  associating each stored textual record with each category structure for which the record's relevance value associated with that category structure exceeds a predetermined threshold;
  maintaining, for each category structure, a list of associated textual records;
  retrieving from the database, for each category structure, the textual records associated with that category structure;
  selecting, from the set of retrieved textual records, a plurality of preferred textual records in a manner responsive to the priority value assigned to each category structure;
  assembling the plurality of preferred textual records to form the preferred set;
  collecting usage information from the subscriber for the retrieved textual records forming the preferred set;
  defining a group of subscribers sharing a common characteristic;
  compiling usage information for the subscribers of the defined group and analyzing the compiled usage information to detect a usage pattern for the group;
  defining one or more new category structures in accordance with the detected usage pattern; and
  assigning a new priority value for the new category structures associated with each subscriber profile for each subscriber belonging to the defined group, this step of assigning comprising:
    assigning a first numerical weight to each new category structure determined by the original priority values for the original category structures in the associated profile;
    assigning a second numerical weight to each new category structure determined by the usage of textual records associated with the new category structure by the subscriber;
    assigning a third numerical weight to each new category structure determined by the usage of the textual records associated with the new category structure by other subscribers previously determined to be peers; and assigning the new priority value for each new category structure determined by summing the first, second, and third numerical weights assigned for each new category structure.

6. The method of claim 5, wherein the defining one or more new category structures comprises redistributing the textual records from a pre-existing category structure into two or more new category structures.

7. The method of claim 5, wherein the defining one or more new category structures comprises combining the textual records from at least two pre-existing category structures in a new category structure.

8. The method of claim 5, wherein the defined group comprises all subscribers.

9. The method of claim 5, wherein the defined group comprises subscribers having a common profession.

10. The method of claim 5, wherein the defined group comprises subscribers having similar geographical location.

* * * * *

UNITED STATES PATENT AND TRADEMARK OFFICE
CERTIFICATE OF CORRECTION

PATENT NO. : 5,537,586
DATED : July 16, 1996
INVENTOR(S) : Amram et al.

It is certified that error appears in the above-indentified patent and that said Letters Patent is hereby corrected as shown below:

On the title page, item [54] and column 1, line 3, change "TEXTURAL" to --TEXTUAL--.

COLUMN 18:

In claim 2, after line 23 of column 18, add the following step between the determining step and the selectively extracting step: --defining the length of the full textual record;--.

Signed and Sealed this

Twenty-ninth Day of October 1996

Attest:

BRUCE LEHMAN

Attesting Officer

Commissioner of Patents and Trademarks